United States Patent
Boloker et al.

(10) Patent No.: US 7,028,306 B2
(45) Date of Patent: Apr. 11, 2006

(54) SYSTEMS AND METHODS FOR IMPLEMENTING MODULAR DOM (DOCUMENT OBJECT MODEL)-BASED MULTI-MODAL BROWSERS

(75) Inventors: David Boloker, Chestnut Hill, MA (US); Rafah A. Hosn, Stamford, CT (US); Photina Jaeyun Jang, White Plains, NY (US); Jan Kleindienst, Kladno (CZ); Tomas Macek, Zizkov (CZ); Stephane H. Maes, Danbury, CT (US); Thiruvilwamalai V. Raman, San Jose, CA (US); Ladislav Seredi, Prague (CZ)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 10/007,092

(22) Filed: Dec. 4, 2001

(65) Prior Publication Data
US 2002/0194388 A1 Dec. 19, 2002

Related U.S. Application Data

(60) Provisional application No. 60/251,085, filed on Dec. 4, 2000.

(51) Int. Cl.
*G06F 15/163* (2006.01)
(52) U.S. Cl. ..................................... 719/310
(58) Field of Classification Search ................ 719/318, 719/310
See application file for complete search history.

(56) References Cited

U.S. PATENT DOCUMENTS

| | | | | |
|---|---|---|---|---|
| 6,317,794 | B1 * | 11/2001 | Papierniak et al. | 709/229 |
| 6,535,912 | B1 * | 3/2003 | Anupam et al. | 709/217 |
| 6,615,172 | B1 * | 9/2003 | Bennett et al. | 704/257 |
| 6,691,176 | B1 * | 2/2004 | Narin et al. | 719/318 |
| 6,721,705 | B1 * | 4/2004 | Kurganov et al. | 704/270.1 |

OTHER PUBLICATIONS

Scott M. Lewandowski, Frameworks for Component-based Client/Server Computing, Mar. 1998.*

* cited by examiner

*Primary Examiner*—Meng-Al T. An
*Assistant Examiner*—LeChi Truong
(74) *Attorney, Agent, or Firm*—Frank V. DeRosa; F.Chau & Associates, LLC

(57) ABSTRACT

Systems and methods for building multi-modal browsers applications and, in particular, to systems and methods for building modular multi-modal browsers using a DOM (Document Object Model) and MVC (Model-View-Controller) framework that enables a user to interact in parallel with the same information via a multiplicity of channels, devices, and/or user interfaces, while presenting a unified, synchronized view of such information across the various channels, devices and/or user interfaces supported by the multi-modal browser. The use of a DOM framework (or specifications similar to DOM) allows existing browsers to be extended without modification of the underling browser code. A multi-modal browser framework is modular and flexible to allow various fat client and thin (distributed) client approaches.

14 Claims, 19 Drawing Sheets

Real Time Conversational Distributed Protocols (RTCDP)

RTSCDP - Real Time Streaming Conversational Distributed Protocols

SYSTEMS AND METHODS FOR IMPLEMENTING MODULAR DOM (DOCUMENT OBJECT MODEL)-BASED MULTI-MODAL BROWSERS

CROSS-REFERENCE TO RELATED APPLICATION

This application is based on U.S. Provisional Application Serial No. 60/251,085, filed on Dec. 4, 2000, which is fully incorporated herein by reference.

BACKGROUND

The present invention relates generally to systems and methods for building multi-modal browsers applications and, in particular, to systems and methods for building modular multi-modal browsers using a DOM (Document Object Model) and MVC (Model-View-Controller) framework that enables a user to interact in parallel with the same information via a multiplicity of channels, devices, and/or user interfaces, while presenting a unified, synchronized view of such information across the various channels, devices and/or user interfaces supported by the multi-modal browser.

The computing world is evolving towards an era where billions of interconnected pervasive clients will communicate with powerful information servers. Indeed, this millennium will be characterized by the availability of multiple information devices that make ubiquitous information access an accepted fact of life. This evolution towards billions of pervasive devices being interconnected via the Internet, wireless networks or spontaneous networks (such as Bluetooth and Jini) will revolutionize the principles underlying man-machine interaction. In the near future, personal information devices will offer ubiquitous access, bringing with them the ability to create, manipulate and exchange any information anywhere and anytime using interaction modalities most suited to the an individual's current needs and abilities. Such devices will include familiar access devices such as conventional telephones, cell phones, smart phones, pocket organizers, PDAs and PCs, which vary widely in the interface peripherals they use to communicate with the user.

The increasing availability of information, along with the rise in the computational power available to each user to manipulate this information, brings with it a concomitant need to increase the bandwidth of man-machine communication. The ability to access information via a multiplicity of appliances, each designed to suit the individual's specific needs and abilities at any given time, necessarily means that these interactions should exploit all available input and output (I/O) modalities to maximize the bandwidth of man-machine communication. Indeed, users will come to demand such multi-modal interaction in order to maximize their interaction with information devices in hands-free, eyes-free environments.

The current networking infrastructure is not configured for providing seamless, multi-modal access to information. Indeed, although a plethora of information can be accessed from servers over a communications network using an access device (e.g., personal information and corporate information available on private networks and public information accessible via a global computer network such as the Internet), the availability of such information may be limited by the modality of the client/access device or the platform-specific software applications with which the user is interacting to obtain such information.

By way of example, one of the most widely used methods for accessing information over a communications network is using a conventional HTML browser to access information over the WWW (world wide web) using, for example, portals such as Yahoo! and AOL. These portals typically include a directory of Web sites, a search engine, news, weather information, e-mail, stock quotes, etc. Typically, only a client/access device having full GUI capability can take advantage of such Web portals for accessing information.

Other conventional portals and access channels include wireless portals/channels that are typically offered by telephone companies or wireless carriers (which provide proprietary content to subscribing users and/or access to the Internet or a wireless portion of the Internet, with no restrictions or access control). These wireless portals may be accessed via WAP (wireless application protocol) by client/access devices (via a WAP browser) having limited GUI capabilities declaratively driven by languages such as WML (wireless markup language), CHTML (compact hypertext markup language) such as NTT DocoMo imode), or XHTML (eXtensible HTML) Mobile Profile (XHTML-MP) as specified by WAP 2.0. WAP together with WML and XHTML-MP and iMode with CHRML allow a user to access the Internet over a cellular phone with constrained screen rendering and limited bandwidth connection capabilities. Currently, wireless portals do not offer seamless multi-modal access (such as voice and GUI) or multi-device (more than one device simultaneously available) regardless of the access device. Instead, a separate voice mode is used for human communication and a separate mode is used for WAP access and WML browsing.

In addition, IVR services and telephone companies can provide voice portals having only speech I/O capabilities. The IVR systems may be programmed using, e.g., proprietary interfaces (state tables, scripts beans, etc.) or VoiceXML (a current speech ML standard) and objects. With a voice portal, a user may access an IVR service and perform voice browsing using a speech browser (or using telephone key pads). Unfortunately, a client/access device having only GUI capability would not be able to directly access information from a voice portal. Likewise, a client/access device having only speech I/O would not be able to access information in a GUI modality.

Currently, new content and applications are being developed for Web accessibility with the intent of delivering such content and application via various channels with different characteristics, wherein the content and applications must be adapted to each channel/device/modality. These "multi-channel applications" (an application that provides ubiquitous access through different channels (e.g., VoiceXML, HTML), one channel at a time) do not provide synchronization or coordination across views of the different channels.

One challenge of multi-channel applications/content is that since new devices and content emerge continuously, this adaptation must be made to work for new devices not originally envisioned during the development process. In addition, it is important to be able to adapt existing content that may not have been created with this multi-channel or multi-modal deployment model in mind.

Further challenges of multi-channel applications is that, notwithstanding that multi-channel applications enable access to information through any device, it is difficult to enter and access data using small devices since keypads and screens are tiny. Further, voice access is more prone to errors and voice output is inherently sequential. One interaction mode does not suit all circumstances: each mode has its pros and cons. One optimal interaction mode at a moment can no more be optimal at another moment or for another user. All-in-one devices are no panacea, and many different devices will coexist. In fact, no immediate relief is in sight for making multi-channel e-business easier. Devices are getting smaller, not larger. Devices and applications are becoming more complex requiring more complex or efficient user interfaces. Adding color, animation, streaming, etc. does not simplify the e-business issues mentioned above. Considering these factors leads to the conclusion that an improved user interface will accelerate the growth of mobile e-business.

Accordingly, systems and methods for building and implementing user interfaces an applications that operate across various channels and information appliances, and which allow a user to interact in parallel with the same information via a multiplicity of channels and user interfaces, while presenting a unified, synchronized view of information across the various channels, are highly desirable. Indeed, there will be an increasingly strong demand for devices and browsers that provide such capabilities.

SUMMARY OF THE INVENTION

The present invention relates generally to systems and methods for building multi-modal browser applications and, in particular, to systems and methods for building modular multi-modal browsers based on a DOM (Document Object Model) and MVC (Model-View-Controller) framework that enables a user to interact in parallel with the same information via a multiplicity of channels, devices, and/or user interfaces, while presenting a unified, synchronized view of such information across the various channels, devices and/or user interfaces supported by the multi-modal browser.

In one aspect of the present invention, a multi-modal browser is based on a MVC (Model-View-Controller) framework, wherein a single information source, Model M (comprising a modality-independent representation of an application) is mapped to a plurality of Views (e.g., different synchronized channels) and manipulated via a plurality of Controllers C1, C2 and C3 (e.g., different browsers such as a speech browser, a GUI browser and a multi-modal browser or different devices). The Controllers act on, transform and manipulate the same underlying Model M to provide synchronized Views. The synchronization of the Views is achieved by generating all Views from, e.g., a single unified representation that is continuously updated.

In one aspect of the invention, a MVC multi-modal browser comprises:

a model manager for managing a model comprising a modality-independent representation of an application, and a plurality of channel-specific controllers, wherein each controller processes and transforms the model to generate a corresponding channel-specific view of the model, wherein the channel-specific views are synchronized by the model manager such that a user interaction in one channel-specific view is reflected in another channel-specific view.

In another aspect, the model manager updates and maintains a dialog state of the model, wherein a user interaction within a given view will update a dialog state of the model. Further, the model manager maintains conversation history and context.

In yet another aspect, the multi-modal shell of the multi-modal browser supports an application model based on a single authoring framework and a multiple authoring framework.

In another aspect of the invention, a multi-modal browser comprises:

a plurality of modality-dependent browsers; and a multi-modal shell for parsing and processing a modality-independent application and managing synchronization of I/O (input/output) events across each view generated by the plurality of modality-dependent browsers, wherein each modality-dependent browser comprises:

an API (application programming interface) for controlling the browser and for managing events; and a wrapper interface comprising synchronization protocols for supporting synchronization of the browser.

Preferably, the associated API for a modality-dependent browser comprises a DOM (document object model) interface and the associated wrapper interface comprises methods for DOM event filtering.

In yet another aspect of the invention, the multi-modal browser is modular allowing fat client and thin client (distributed) topologies, as well as other possible configurations where the components are distributed across multiple devices or servers in the network.

In another aspect of the invention, a multi-modal shell comprises: a model manager for maintaining a dialog state of the application; a TAV (transformation/adaption/view preparation) manager for preparing and transforming pages or page snippets; and a synchronization manager for managing event notifications to the browsers. The components of a multi-modal shell can be distributed.

In yet another aspect of the invention, a WAP (wireless application protocol) multi-modal browser comprises:

a GUI (graphical user interface) browser comprising a DOM (document object model) interface for controlling the GUI browser and managing DOM and event notification and a wrapper interface for filtering events;

a speech application server comprising: a voice browser, wherein the voice browser comprises a DOM interface for controlling the voice browser and event notification and a wrapper interface for filtering events; an audio system for capturing and encoding speech data; and one or more speech engines for processing speech data; and a multi-modal shell for parsing and processing a modality-independent application and managing synchronization of I/O (input/output) events between the GUI and voice browsers.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

Figure 1:
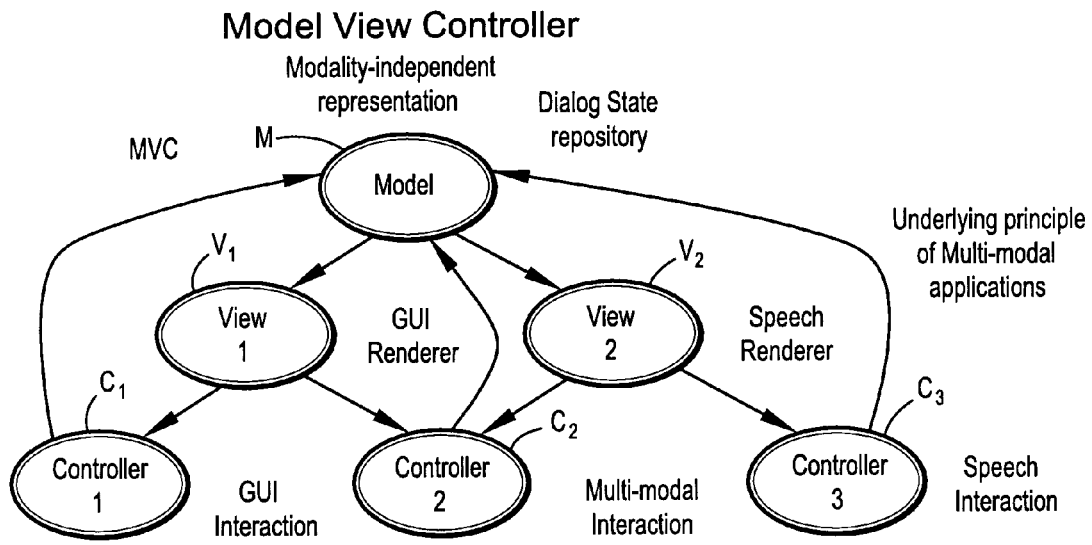
FIG. 1 is a diagram illustrating a MVC framework according to, an embodiment of the present invention, which is preferably employed for building a multi-modal browser according to the present invention.

The present invention relates generally to systems and methods for building multi-modal user interfaces and applications, and in particular, to systems and methods for building modular multi-modal browsers based on a DOM (Document Object Model) and MVC (Model-View-Controller) framework that enables a user to interact in parallel with the same information via a multiplicity of channels, devices, and/or user interfaces, while presenting a unified, synchronized view of such information across the various channels, devices and/or user interfaces supported by the multi-modal browser The following detailed description of preferred embodiments is divided into the following sections for ease of reference:

Section I below provides a general description of features and functionalities of a multi-modal browser according to the present invention, as well as the need, motivation and advantages of implementing a MVC and DOM-based multi-modal browser framework according to the present invention;

Section II describes preferred embodiments of a MVC architecture for building a multi-modal browser;

Section III describes various programming models that may be employed with a MVC-based multi-modal browser according to the present invention, wherein section III(A) describes single authoring programming paradigms and section III(B) describes multiple authoring programming paradigms;

Section IV outlines preferred features and characteristics of a multi-modal browser according to the present invention;

Section V generally describes various frameworks for building multi-modal browsers according to the present invention;

Section VI describes various architectures of multi-modal shells (or interaction managers) according to the present invention;

Section VII describes communication protocols that may be implemented in connection with a multi-modal browser framework according to the present invention, including, for example, conversational coding, transport and control protocols for encoding and transporting speech data and for control of distributed functions, as well as synchronization protocols for synchronizing information exchange between a multi-modal shell and various component browsers; and Section VIII describes various exemplary embodiments of a multi-modal browser that can be implemented according to the present invention.

It is to be understood that the term "channel" used herein refers to a particular renderer, device, or a particular modality. Examples of different modalities/channels include speech such as VoiceXML, visual (GUI) such as HTML (hypertext markup language), restrained GUI such as WML (wireless markup language), CHTML (compact HTML), XHTML-MP and HDML (handheld device markup language) or any combination of such modalities.

The term "multi-channel application" refers to an application that provides ubiquitous access through different channels (e.g., VoiceXML, HTML), one channel at a time. Multi-channel applications do not provide synchronization or coordination across the views of the different channels.

The term "multi-modal" application refers to multi-channel applications, wherein multiple channels are simultaneously available and synchronized. Furthermore, from a multi-channel point of view, multi-modality can be considered another channel. As explained herein, the granularity of the synchronization may vary between sequential (i.e., suspend and resume mode), page level, block level (page fragments), slot level (gesture by gesture or dialog turn by dialog turn), event level/simultaneous and merged input (e.g., simultaneous voice and GUI input to time stamp and address as a single input).

Furthermore, the term "conversational" or "conversational computing" as used herein refers to seamless multi-modal dialog (information exchanges) between user and machine and between devices or platforms of varying modalities (I/O capabilities), regardless of the I/O capabilities of the access device/channel, preferably, using open, interoperable communication protocols and standards, as well as a conversational (or interaction-based) programming model that separates the application data content (tier 3) business logic (tier 2) from the user interaction and data model that the user manipulates. The term "conversational application" refers to an application that supports multi-modal, free flow interactions (e.g., mixed initiative dialogs) within the application and across independently developed applications, preferably using short term and long term context (including previous input and output) to disambiguate and understand the user's intention. Conversational application preferably utilize NLU (natural language understanding).

I. Motivation For Employing MVC and DOM-based Multi-Modal Browsers

A multi-modal browser framework according to the present invention is particularly advantageous for use with the Mobile Internet. Indeed, a value proposition for e-business solutions is to employ multi-modal applications/user interfaces/devices that allow users to: (i) enter and access data easily using small mobile devices (since, e.g., talking is easier than typing and reading is faster than listening); (ii) choose the interaction mode that suits the task and circumstances (e.g., input: key, touch, stylus, voice, output: display, tactile, audio, etc.); and to (iii) utilize several devices in combination (to thereby take advantage of the unique capabilities of each device). A multi-modal browser application according to the present invention provides seamless user interaction with multiple channels and devices. Indeed, it is expected that the mobile Internet will readily adopt user interfaces and applications that enable multiple, coordinated information channels—running either on the same or multiple devices or middleware—to be used simultaneously to gain sequential or parallel information access.

A multi-modal user browser according to the present invention allows a user to select an optimal interaction mode for each interaction between a user and an application. For example, stock charts or maps are more easily viewed as images, while complex queries are more effectively entered by voice. The choice of a particular interaction mode can be made by the developer of the application, or it can be left up to the user. For example, even if an interaction might be most effectively conducted via voice, a user may prefer to use stylus input if there are other people in the room. Similarly, even if an interaction is well-suited for a visual display and touch input, a user may prefer to use voice when his hands and eyes are busy. And a user who is interacting with an application by voice, say trying to arrange a flight while walking, may stop walking in order to interact visually when reaching a certain point in the application where he knows or feels that visual interaction is faster.

A multi-modal browser according to the present invention improves user interaction by allowing multiple, coordinated information channels—running either on the same or multiple devices or middleware—to be used simultaneously to gain sequential or parallel information access. A multi-modal browser framework according to the present invention provides a mechanism for parallel use of multiple access channels whereby transactions are shared across different devices. In addition, mechanisms are provided whereby updates to the underlying information via any given device or interface is immediately reflected in all available views of the information. A multi-modal browser (or multi-device browser) provides such coordinated, parallel user interaction by maintaining and utilizing shared application context and history, which enables all participating channels to share equally in the conversation with the user. The different channels provide similar and equivalent functionality while ensuring that the user is presented with consistent views of the underlying information that is being manipulated. In addition, interaction context and history is preferably synchronized across the various channels or devices so as to enable seamless transitions in the user interaction amongst the various channels or devices. Thus, user interaction with a specific device is reflected across all available channels; conversely, each available channel is primed to carry on the conversation with the user where a previously active device leaves off. This is closely related to the issues of transactional persistence/suspend and resume which, for example, enables a transaction performed on a PC to be interrupted and continued soon after by voice or WAP over a cell phone.

A multi-modal browser framework according to the present invention is applicable to multi-device applications and multi-channel applications. The synchronized and coordinated use of multiple devices in parallel will be especially important among pervasive clients. Today, users juggle between cell phones, pagers, PDAs and laptops. Synchronization mechanisms are provided but they merely guarantee that part of the information is shared and kept up to date across the devices.

An underlying principle of an MVC-based multi-modal browser according to the present invention is that a user participates in a conversation with various available information channels all of which communicate with a common information backend to manipulate a single synchronized model. The different participants in the conversation—including the user—will use the most appropriate modality to communicate with the target of the current portion of the conversation. Notice that when phrased as above, the role of the user and the various devices participating in the conversation is symmetric—a user can choose to point or use other visual gestures to interact with a particular device while using spoken commands to direct other portions of the conversation. The multi-modal interface driving the various devices can equivalently choose to display certain information visually while speaking other aspects of the conversation.

Key aspects of this form of interaction include the ability of a multi-modal browser to use the best possible combination of interface modalities based on the user's current preferences, needs and abilities as well as the application requirements and device capabilities. At the same time, the system is characterized by the ability to dynamically update its choice of modalities based on what the user chooses to do. Thus, upon failure of the user to respond to a spoken prompt, the system might choose to revert to a visual interface—an implicit assumption that the user is in environment where speech interaction is inappropriate—equivalently, a spoken request from the user might cause the system to update its behavior to switch from visual to spoken interaction.

Thus, a multi-modal browser application that is constructed in accordance with the present invention using mechanisms described herein advantageously support seamless transitions in the user interaction amongst the different modalities available to the user, whether such user interaction is on one or across multiple devices. When appropriate multi-modal user interface middleware becomes available, application developers and users will influence what information and under what preferred form is provided and acted upon in each modality. Automatic adaptation of the applications based on this consideration can be available on the server (application adaptation) or on the connected clients (user preferences, browser rendering features). A user interface according to the present invention supports dynamic and often unpredictable dynamic switches across modalities. Indeed, based on the user's activities and environment, the preferred modality can suddenly change. For example, a speech-driven (or speech and GUI) banking transaction will probably become GUI only if other people enter the room. Transactions that the user could not complete in his office are to be completed in voice only or voice only/GU constrained mode in the car. Preferred MVC frameworks that may be used to build multi-modal browser architectures according to the present invention are described, for example, in U.S. patent application Ser. No. 10/007,037, filed concurrently herewith on Dec. 4, 2001, (Express Mail Number EL797416039US), entitled "MVC (Model-View-Controller) BASED MULTI-MODAL AUTHORING TOOL AND DEVELOPMENT ENVIRONMENT", which is commonly assigned and incorporated herein by reference.

The DOM (Document Object Model) is a programming interface specification being developed by the World Wide Web Consortium (W3C) (see, e.g., www.w3.org). In general, DOM is a platform and language-neutral interface that allows programs and scripts to dynamically access and update the content, structure and style of documents. The document can be further processed and the results of that processing can be incorporated back into the presented page. With DOM, programmers can build documents, navigate their structure, and add, modify, or delete elements and content. Virtually, anything found in an HTML or XML document can be accessed, changed, deleted, or added using DOM.

In other words, the DOM is a programming API for documents. It is based on an object structure that closely resembles the structure of documents it models. The DOM is a logical model that may be implemented in any convenient manner such as a tree structure. Indeed, the name "Document Object Model" refers to the fact that documents are modeled using objects, and the model encompasses not only the structure of a document, but also the behavior of a document and the objects of which it is composed. In other words, the nodes of a DOM represent objects, which have functions and identity. As an object model, the DOM identifies: (i) the interfaces and objects used to represent and manipulate a document (ii) the semantics of these interfaces and objects—including both behavior and attributes (iii) the relationships and collaborations among these interfaces and objects.

The following is a brief detailed discussion regarding DOM, the use of the DOM, and how DOM can be implemented on user agents such as GUI user agents (e.g, WAP) and other pervasive devices. For the sake of discussion and by analogy to WAP, this DOM will be referred to as a DOM-MP (mobile profile).

DOM presents documents as a hierarchy of node objects that also implement other, more specialized interfaces. Some types of nodes may have child nodes of various types, and others are leaf nodes that cannot have anything below them in the document structure. Most of the APIs defined by the DOM specification are interfaces. A generic specification of DOM, including DOM level 1, 2 and 3 is known in the art and can be found, for example, in the reference by Arnaud Le Hors et al., Document Object Model (DOM) Level 3 Core Specification, version 1.0, W3C working draft, Sep. 13, 2001 (www.w3.org/TR/DOM-Level-3-Core).

The DOM provides a design of a generic event system that: (i) allows registration of event handlers, describes event flow through a tree structure, and provides basic contextual information for each event; (ii) provides standard modules of events for user interface control and document mutation notifications, including defined contextual information for each of these event modules; and (iii) provides a common subset of the current event systems used in DOM Level 0 browsers. This is intended to foster interoperability of existing scripts and content. The overall DOM L3 architecture is presented in the above reference. Each DOM level builds on the preceding level.

The following is a brief discussion of various DOM Interfaces. DOM Queries are interfaces that only enable access without modification to the DOM tree (structure and data). DOM Manipulation interfaces can artificially be more finely categorized as: (i) DOM Data manipulation interfaces that are used to access and modify data stored in the DOM tree without changing the structure of the tree; and (ii) DOM Tree manipulation interfaces that are used to access and modify the DOM tree structure. Moreover, DOM load/save provide interfaces for loading an XML document into a DOM tree or saving a DOM tree into an XML document, which includes many options to control load and save operations. Note that some functions can be fall under the categories of DOM data manipulation and DOM tree manipulation.

The DOM specification defines various types of events. For instance, User interface events are generated by user interaction through an external device (mouse, keyboard, etc.). UI Logical events are device independent user interface events such as focus change messages or element triggering notifications. Mutation events are events caused by any action which modifies the structure of the document.

The DOM describes various types of event flow. For instance, with the basic event flow, each event has an "event's target" toward which the event is directed by the DOM implementation. This "events target" is specified in the event's target attribute. When the event reaches the target, any event listeners registered on the event's target are triggered. Although all event's listeners on the events target are guaranteed to be triggered by any event which is received by that event's target, no specification is made as to the order in which they will receive the event with regards to the other event listeners on the event's target. If neither event capture nor event bubbling are in use for that particular event, the event flow process will complete after all listeners have been triggered. If event capture or event bubbling is in use, the event flow will be modified as described in the sections below. Any exceptions thrown inside an events listener will not stop propagation of the event. It will continue processing any additional events listener in the described manner. It is expected that actions taken by events listeners may cause additional events to fire.

Another event flow is Capturing, which is a process by which an event can be handled by one of the event's target's ancestors before being handled by the event's target. In addition, Bubbling is a process by which an event propagates upward through its ancestors after being handled by the event's target. Further, Cancelable is a designation for events which indicates that upon handling the event, the client may choose to prevent the DOM implementation from processing any default action associated with the event.

In accordance with the present invention, as explained in detail below, a DOM interface and associated mechanisms are preferably implemented with conventional browsers (such as WML and VoiceXML browsers) to provide support for browser control and event notification in a multi-modal browser using event specifications according to the present invention as described herein together with, e.g., DOM L2 event specifications. The sychronization granularity between the various views supported by the multi-modal browser will vary depending on the complexity of the DOM interface and synchronization mechanism that are supported. As will be apparent from the following detailed description of preferred embodiment, an MVC and DOM-based multi-modal framework according to the present invention provides an extremely modular and flexible approach to enabling various "fat" client and distributed "thin" client approaches using known network standards and frameworks.

II. Presenting Unified Information Views Via a Model-View-Controller Paradigm

FIG. 1 is a diagram illustrating a preferred programming paradigm for implementing a multi-modal application in accordance with the above-described concepts. A multi-modal application is preferably based on a MVC (model-view-controller) paradigm as illustrated in FIG. 1., wherein a single information source, Model M (e.g., a modality-independent representation of an application) is mapped to a plurality of Views (V1, V2) (e.g., different synchronized channels) and manipulated via a plurality of Controllers C1, C2 and C3 (e.g., different browsers such as a speech browser, a GUI browser and a multi-modal browser). More specifically, with this architecture, a multi-modal system comprises a plurality of Controllers (e.g., C1, C2, and C3) that act on, transform and manipulate the same underlying Model M to provide synchronized Views V1, V2 (i.e., to transform the single Model M to multiple synchronous Views). The synchronization of the Views is achieved by generating all Views from, e.g., a single unified representation that is continuously updated. A single Model M is transformed to multiple synchronous Views. These transformations can be inverted to map specific portions of a given View to the underlying Model M. Assume Ti denotes the mapping of the model M to the View i and $T_1^{-1}$ denotes the inverted mapping, composing Ti using $Ti_1^{-1}$ for appropriate values of i enables synchronization among the Views.

In other words, an MVC-based multi-modal system such as shown in FIG. 1 enables seamless switches between channels at any time, by continuously maintaining and updating the same state of the dialog in all interacting views, whether such channels comprise different devices or different modalities. A further consequence of the decision to embody multi-modal systems as collections of Controllers all of which manipulate the same underlying Model to provide synchronized Views, is that the system can be local (e.g. fat client) or distributed. This synchronization of Views is a direct consequence of generating all Views from a single unified representation that is continuously updated; the single modality-independent (channel-independent) representation provides the underpinnings for coordinating the various Views.

To see this, consider each View as a transformation of the underlying modality-independent representation and consider that the modality-independent representation is described in XML (declarative case). In this instance, the Model can be viewed as an abstract tree structure that is mapped to channel-specific presentational tree structures. These transformations provide a natural mapping amongst the various Views since any portion of any given View can be mapped back to the generating portion of the underlying modality-independent representation, and this portion consequently mapped back to the corresponding View in a different modality by applying the appropriate transformation rules.

Thus, in a preferred embodiment of the present invention, a multi-modal browser application is based on the MVC paradigm. The existence of a modality independent representation (authored or inferred) of the application enables implementation of the MVC, where the state of the application in that representation can be considered as the Model of the MVC architecture. More specifically, the Model of the interaction, which is independent of the rendering channel or modality, comprises a repository of the current dialog state, the dialog flow as currently known by the application and the whole conversation history and context when context management is needed. Any user interactions within a modality must act on the conversation Model before being reflected on the different Views.

III. Programming Models for Applications and MVC

It is to be appreciated that an multi-modal browser comprising a MVC framework such as shown in FIG. 1 can support either single or multiple authoring approaches. An MVC-based multi-modal browser according to the present invention can provide different levels of synchronization across the different modalities/channels/devices supported by an application, depending on the limits supported by the authoring method. For instance, a multiple authoring paradigm can support a given level of granularity, whereas a single authoring paradigm can advantageously support any level of synchronization.

A. Single Authoring

In general, "single authoring" refers to a programming model for authoring multi-modal applications, wherein the multi-modal application is specified in a representation that is independent of the target channel or modalities. Further, the modality-independent representation is specialized/optimzed for target devices or device classes. An underlying principle of single authoring is the Model-View-Controller, wherein the Model comprises a channel independent description of the application, each channel comprises a View of the model, and the Views are obtained by transforming the model representation into its target form which is rendered by Controllers such as channel specific browsers (e.g. WAP browser (WML or XHTML-MP), Web/HTML browser, C-HTML browser, HDML browser, VoiceXML voice browser, etc.). The user interacts with each View through a browser. Further, as multi-modality can be considered as a particular type of channel, the MVC principle becomes especially relevant for multi-modal or multi-device interactions. The user interacts via the Controller on a given View. Instead of modifying the View, his or her actions update the state of the Model, which results in an update of the different registered Views to be synchronized.

Accordingly, in a preferred embodiment of the present invention, a MVC-based multi-modal browser supports single authoring across a large variety of devices and modalities. Assume that "gestures" comprise units of synchronized blocks. For a single authoring method, gestures comprise elementary units defined by the language syntax and for which transformation rules are available for each View (channel). The Model (application) comprises a modality-independent representation that is dynamically transformed into the different channel specific languages. Naming conventions or node identification are associated to each of the resulting elements in each channel. Since any portion of any given View can be mapped back (through the node identification) to the generating portion of the underlying modality-independent representation, and this portion consequently mapped back to the corresponding View in a different modality by applying the appropriate transformation rules, the approach automatically satisfies the MVC principle.

Single authoring is motivated by the need to author, maintain, and revise content for delivery to an ever-increasing range of end-user devices. Generally, in a preferred embodiment, a single authoring programming paradigm enables separation of specific content from the presentation enabling reusable style sheets for default presentation in the final form. Specialization can then be performed in-line or via channel specific style sheets.

Single authoring for delivering to a multiplicity of synchronized target devices and environment provides significant advantages. For instance, as we evolve towards devices that deliver multi-modal user interaction, single authoring enables the generation of tightly synchronized presentations across different channels, without requiring re-authoring of the multi-channel applications. The MVC principle guarantees that these applications are also ready for synchronization across channels.

Such synchronization allows user intent expressed in a given channel to be propagated to all the interaction components of a multi-modal system. Multi-modal systems according to the present invention may be classified as "tightly-coupled" multi-modal interactions or "loosely-coupled" multi-modal interactions where each channel has its own model that periodically synchronizes with the models associated to the other channels. A tightly-coupled solution can support a wide range of synchronization granularities, as well as provide optimization of the interaction by allowing given interactions to take place in the channel that is best suited as well as to revert to another channel when it is not available or capable enough. The same approach can be extended to multi-device browsing whereby an application is simultaneously accessed through different synchronized browsers.

Figure 2:
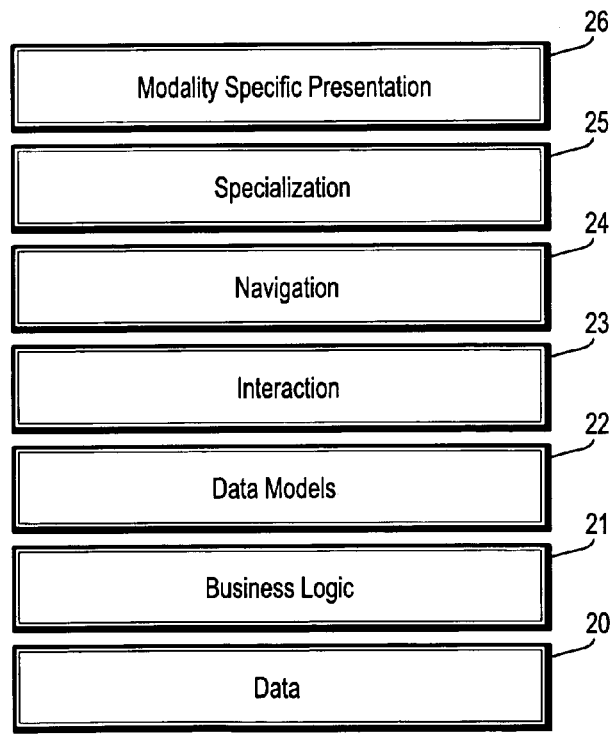
FIG. 2 is a diagram illustrating a programming framework for a single authoring programming paradigm which is preferably used for implementing a MVC-based multi-modal browser according to the present invention.

In a preferred embodiment of the present invention, an MVC-based multi-modal browser processes applications that comprise a single authoring programming framework that separates content, presentation, and interaction. For example, FIG. 2 is a diagram illustrating various programming layers comprising a single authoring programming model for implementing an application. A preferred single authoring model separates various programming layers comprising a backend data layer 20, a business logic layer 21, a data model layer 22, an interaction logic layer 23, a navigation layer 24, a specialization layer 25, and a modality-specific rendering layer 26. The business logic layer 21 is the portion of an application that contains the logic, i.e., encoded set of states and conditions that drive the evolution of the application, as well as variable validation information. In a preferred embodiment, the data models 22 (or data type primitives) are XML Schema compliant and defined in accordance with the proposed WC3 standard XFORMS Data Model (see, e.g., http:///www/w3.org/TR/xforms/). A modality-independent application preferably defines a data model, for the data items to be populated by the user interaction, and then declares the user interface that makes up the application dialogues.

The interaction layer 23 abstracts the application in terms of a finite set of interaction primitives (e.g., conversational gestures) to encapsulate the interaction logic in a modality-independent manner. One example of a preferred interaction language referred to as Interaction Markup Language (iML) will be explained in detail below.

The modality-specific presentation of the application as provided by the modality-specific presentation layer 26 is preferably based on the proposed XForms standard of separation of UI from the data models 22 (although the data model can be expressed using other suitable techniques). Lastly, the specialization layer 25 provides a mechanism for cosmetic altering a one or more features of a presentation, in one or more modalities. A default rendering of the conversational gestures depends solely on the gestures and the target modality or channel.

Separating content from presentation to achieve content re-use is a widely accepted way of deploying future information on the World Wide Web. In the current W3C architecture, such separation is achieved by representing content in XML that is then transformed to appropriate final-form presentations via XSL transforms. Other transformation mechanisms could be considered. A single authoring paradigm is particularly advantageous since in the near future, various embodiments of multi-modal browsers will be distributed. It will therefore be especially advantageous to support adaptation the granularity level of synchronization across the views to the network load or available bandwidth. Adaptation to the user's preferences or browser capabilities can also be supported.

Thus, the Model of an MVC framework according to the present invention preferably implements an application that is represented in a way that is independent of the target channel. Such representation abstractly describes the interaction and the data model that the user manipulates through it. At that level, the application is fully functional, independently of the modality or device where it will be rendered. Dynamic content and backend access to the business logical are conventionally programmed. The application can be transformed into presentations (final form) using default transformation rules that depend only on the target channel. Such presentations are defaults views of the applications adapted to the channel.

The application can now be specialized to specific channels or classes of channels. This can be done in-line or by specializing specific transformation rules. In particular such specialization can address the navigation flow, cosmetic layering and nature of the content finally presented to the user in each channel or channel class. Specialization of a fully functional channel-independent version of the application is a very efficient way to develop and maintain multi-channel applications.

Figure 3:
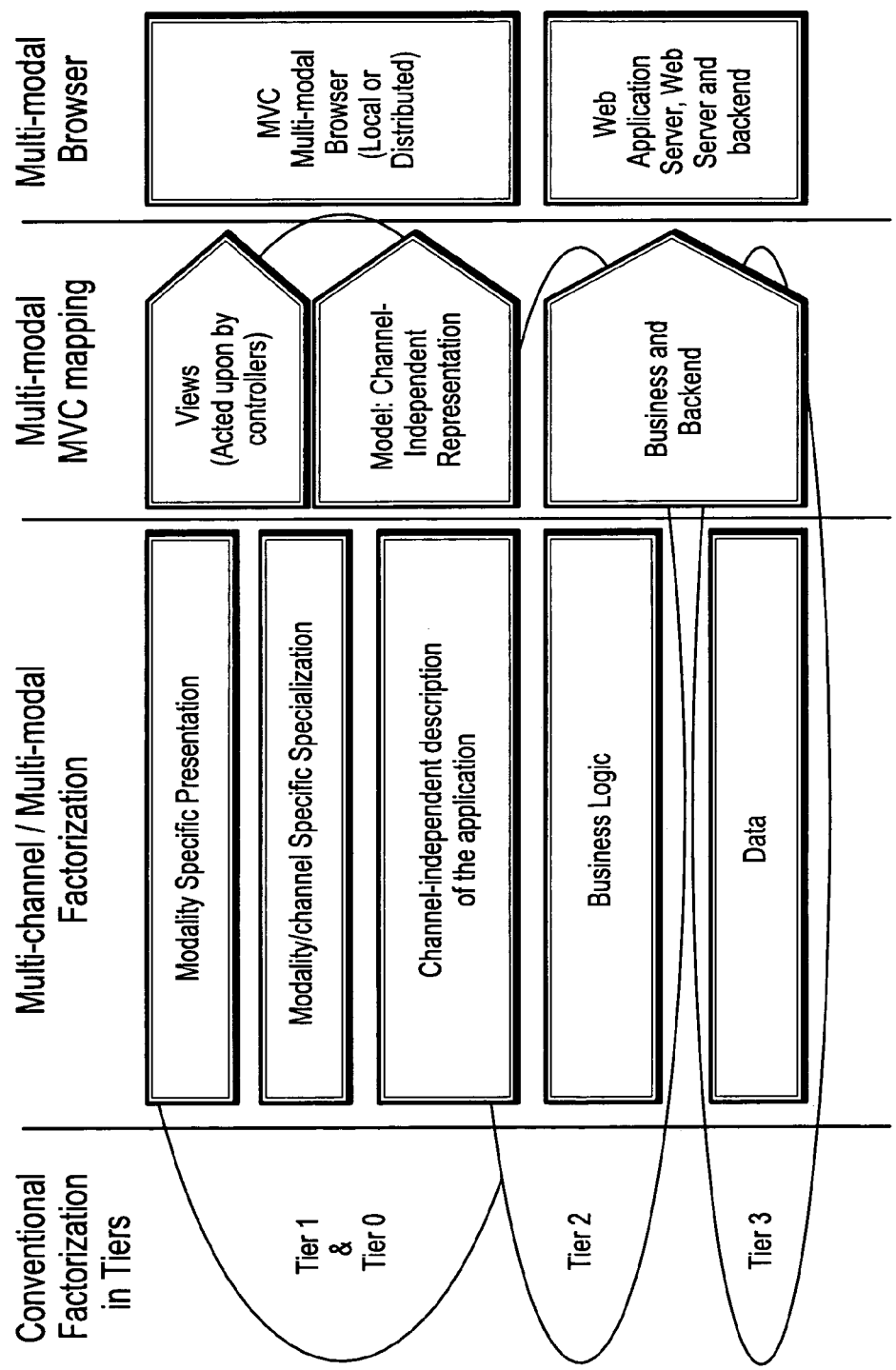
FIG. 3 is a diagram illustrating a relationship between various programming tiers of a MVC framework and single authoring programming model, according to one aspect of the present invention.

An MVC framework according to the present invention is associated with the layer of an application that, in the 3-tier nomenclature, is conventionally called the presentation layer or tier 1 (and sometimes tier 0 when pervasive thin clients are introduced), as illustrated in FIG. 3. In FIG. 3, Tier 3 comprises the database (data) and an application to manage the database. Tier-2 comprises the business logic that runs on a Web application server, Web server, etc., which acts as a server to client requests. It is to be understood that the MVC concept of a modality independent representation of the application assumes that the conventional presentation layer (tier-1 and/or tier 0) is more finely factored and its boundary is somehow moved with respect to Tier 2 the business logic layer. FIG. 3 illustrates this issue, wherein Tier 2 overlaps Tier 1, Tier 0. Depending on the approach and programming methodologies, the correspondence between the various tiers can change.

In FIG. 3, it is assumed that a refinement of the decomposition into more tiers or layers and an implicit programming model for multi-modal applications guarantees the existence of a single modality/channel independent Model. With multiple authoring (as described below), this Model comprises a description of the synchronized blocks and their navigation flow. The Model needs to be extracted from the received ML page(s). Clearly, this Model depends on the type of modalities/channels to synchronize and issues like different prompts in different modalities or elements not addressed in a given modalities are addressed during authoring of the application. With single authoring, the Model describes the data model manipulated by the user and how this manipulation takes place (interaction). In one embodiment, the Model essentially comprises a DOM (Document Object Model) of the received page. This model, up to additional modality specific specializations, does not need to be aware of the type of modalities/channels to synchronize. Issues such as different prompts in different modalities or elements not addressed in a given modalities are taken care of at authoring during the specialization step.

Therefore, there is only one model and it must exist for the application that needs to be synchronized. But as indicated above, it will exist if the application is authored to support synchronization of different channels; by definition. Further, supported modalities do not affect the other tiers except for, e.g., the programming model or methodologies used to develop multi-modal applications and specializations that affect the business logic or data content (e.g. nature of the prompt).

Because there is only one model defined as above, it does not matter at the level of the model that the dialog will be by voice, GUI or a synchronized combination of the two. Therefore, if the two other tier layers of an application have been developed with this programming model in mind, then none of these layers should be affected either by the modality(ies) used.

So the model is not highly dependent on the used output media, but of course the resulting (synchronized) presentations are. There is only one application across the different tiers but it must be written to fit this programming methodology and the presence of an intermediate model. This can be achieved by various conventional and new approaches. In other words, the application is authored to reflect the differences in terms of the output presented to the user as generated by the 2nd tier for different modalities.

Of course, it is ultimately all a question of definition. If one considers that the Model of an MVC framework according to the present invention comprises the entire application across all tiers, then it could be considered that there is still one Model but it now dynamically adapts its behavior to the channels that it has to support and synchronize. But it is possible to see that as a set of different MVCs. Preferably, this view is not considered since it is preferable to, e.g., decouple a multi-modal browser from the backend tiers to prevent the multi-modal browser architecture from being directly tangled with the rest of the middle ware architecture and bound to middle ware and programming model choices that the web server provider or ASP may make.

A preferred embodiment of an interaction-based programming model that may be implemented in an MVC framework according to the present invention is described, for example, in U.S. patent application Ser. No. 09/544,823, filed on Apr. 6, 2000, entitled: "*Methods and Systems For Multi-Modal Browsing and Implementation of A Conversational Markup Language*", which is commonly assigned and fully incorporated herein by reference. In general, U.S. Ser. No. 09/544,823 describes a new programming paradigm for an interaction-based iML (interaction markup language) in which the application content (business logic and backend access) is separate from user interaction. More specifically, a IML programming model separates application programming into content aspects, presentation aspects and interaction aspects.

IML preferably comprises a high-level XML-based language for representing "dialogs" or "conversations" between user and machine, which is preferably implemented in a modality-independent, single authoring format using a plurality of "conversational gestures." Conversational gestures comprise elementary dialog components (interaction-based elements) that characterize the dialog interaction with the user and are bound to the data model manipulated by the user. Each conversational gesture provides an abstract representation of a dialog independent from the characteristics and UI offered by the device or application that is responsible for rendering the presentation material. In other words, the conversational gestures are modality-independent building blocks that can be combined to represent any type of intent-based user interaction. A gesture-based IML, for example, allows an application to be written in a manner which is independent of the content/application logic and presentation (i.e., gesture-based IML encapsulates man-machine interaction in a modality-independent manner).

Conversational gestures may be encoded either declaratively (e.g., using XML as indicated above) or imperatively/procedurally. Conversational gestures comprise a single, modality-independent model and can be transformed to appropriate modality-specific user interfaces, preferably in a manner that achieves synchronization across multiple controllers (e.g., speech and GUI browsers, etc.) as the controllers manipulate modality-specific views of the single modality-independent model. Indeed, application interfaces authored using gesture-based IML can be delivered to different devices such as desktop browsers and hand-held information appliances by transcoding the device-independent IML to a modality/device specific representation, e.g., HTML, WML, or VoiceXML.

In general, user interactions authored in gesture-based IML preferably have the following format:

```
<iml>
    <model id= "model_name">. . . /model>
    <interaction model_ref="model_name"="name". . . ./interaction.
<iml>
```

The IML document defines a data model for the data items to be populated by the user interaction, and then declares the user interface that makes up the application dialogues. Optionally, the IML document may declare a default instance for use as the set of default values when initializing the user interface. The data items are preferably defined in a manner conformant to XFORMS DataModel and XSchema. The Data models are tagged with a unique id attribute, wherein the value of the id attribute is used as the value of an attribute, referred to herein as model_ref on a given gesture element, denoted interaction, to specify the data model that is to be used for the interaction.

By way of example, the following IML document defines a user interaction for a soda machine:

```
<iml>
    <model id="SodaMachine">
        <string name= "command" enumeration= "closed">
            <value>drink</value>
            <value>credit</value>
        </string>
        <number name= "credit"/>
        <string name = "drink"
            enumeration="dynamic"
            src="http://localhost/servlets/coke-machine/drinks"/>
    </model>
    <interaction  name = "SodaMachine"
                model_ref = "sodaMachine">
    <caption>Soda Machine</caption>
    <menu>
        <choices>
            <choice value = "#credit">Insert a coin</choice>
            <choice value = "#drink">Select drink</choice>
        </choices>
    </menu>
    <dialog id= "credit"
        action = "submit">
        <assign name = "SodaMachine.command" expr= "credit"/>
        <input name = "SodaMachine.credit">
          <caption>How much would you like to deposit?</caption>
          <help> You can deposit money into this coke machine - - this
                will give you credit for obtaining the drink of
                your choice
          </help>
        </input>
    </dialog>
    <dialog id= "drink"
        action= "submit">
        <assign name = "SodaMachine.command" expr= "drink"/>
        <select name = "SodaMachine.drink">
          <caption>What would you like to drink?</caption>
          <help>You can pick one of the available drinks. What would
you like to drink?
          </help>
        </select>
    </dialog>
    <submit target= "http://localhost/servlets/soda/executeRequest.class">
        <message>Submitting your request to the soda
          machine.
        </message>
    </submit>
    </interaction>
</iml>
```

This exemplary IML document first declares a data model for the fields to be populated by the user interaction: the field command is an enumeration of type string with a fixed set of valid values; field drink is an enumeration of type string where the range of valid values is dynamic i.e., determined at runtime; and the field credit of type number is an example of another predefined atomic type number. The element interaction specifies the various portions of the user interaction. The soda machine allows the user to either deposit some money or to pick a drink—these possible user actions are encapsulated in separate conversational gestures. The first gesture within element interaction is a menu that allows the user to pick one of the available actions. Each user action is encapsulated within a separate dialog element that each have an action attribute with value set to submit; upon completion of the gesture, interaction proceeds to gesture submit that is responsible for submitting the expressed user intent to the back-end application.

The gesture dialog for the first of the possible user actions obtains a value for field credit from the user the gesture dialog for selecting a drink uses a select gesture to allow the user to pick one of the available drinks. The list of available choices—like the list of acceptable values for the corresponding enumeration in the data model—is dynamic and is looked up at runtime. The gestures input and select in this example use IML elements caption and help to encapsulate the user prompt and help text. These elements can be further specialized to include modality-specific content where necessary (i.e., specialization).

Cosmetization or specialization is a method for optimizing an application for a given channel (device, modality or browser) or a class of channel (e.g., Nokia cell phones, etc.). For example, specialization may includes providing a background for a page, changing the layering of a page into frames, fragmenting a WML document across multiple deck of cards, specifying the voice characteristics for a TTS prompt or an audio prompt to play back, changing the message to present to the user when spoken versus the displayed message, skipping a gesture not needed in a given modality, etc. This concept is analogous to cosmetized XSL rules for the conversational gestures as described in the above-incorporated U.S. Ser. No. 09/544,823.

It is to be understood that the modality-independent representation, i.e. the Model or interaction logic layer (which comprises interaction, data model, possible customization meta-data) does not have to be authored in single authoring (i.e., Xforms), although of course this is a preferred embodiment. It is possible that the Model be authored by another approach wherein a pseudo interaction logic is inferred from the synchronization information. Also, the author can explicitly author an interaction logic layer (e.g. XForms) and binds to it one or more synchronized presentation layers instead of relying on automatic generation of them based on the adaptation process of the interaction logic. These techniques are described in detail in the above incorporated patent application Ser. No. 10/007,037, "MVC (Model-View-Controller) BASED MULTI-MODAL AUTHORING TOOL AND DEVELOPMENT ENVIRONMENT."

B. Multiple Authoring:

In another embodiment of the present invention, an MVC framework supports a multiple authoring programming model. Generally, multiple authoring refers to a programming method wherein a multi-modal application is authored by specifying the application in each modality as well as authoring the synchronization information across the modalities. By way of example, assume that gestures are units of synchronized blocks. For multiple authoring, gestures are the blocks in each modality that are synchronized with one another. Different approaches to synchronization using a multiple authoring paradigm are described for example in the above-incorporated patent application Ser. No. 10/007,037, "MVC (Model-View-Controller) Based Multi-Modal Authoring Tool and Development Environment" and in U.S. patent application Ser. No. 09/507,526, filed on February 18, entitled: "Systems And Methods For Synchronizing Multi-Modal Interactions", which is commonly assigned and fully incorporated herein by reference.

By way of example, explicit synchronization tags (e.g., co-visit URL tags) may be used which indicate that when reaching this item, a new page must be loaded by the other view. Typically, the synchronization tags delimitate the gestures on the pages. These approaches extend each channel-specific presentation language to add the co-visit tags. Based on the MVC principle discussed above, the synchronization tags should result into an update of the model, followed by an update of all corresponding associated views. Submit result into polling all the views before submitting to the backend.

In another approach to synchronization using naming conventions, the pages in each modality/channel are authored in unmodified channel-specific languages and gestures are defined by re-using appropriate name conventions for the corresponding elements in each channel. Submit result into polling all the views before submitting to the backend. This is the authoring method used for a "loosely" coupled browser.

Another method for synchronization utilizes merged pages, wherein an application is authored by combining snippets from each synchronized modality, re-using unmodified channel specific languages. Gestures are clearly delimitated as combined snippets. If the merged file is parsed in the model, a multi-modal implementation can be obtained by, e.g., shipping well-formatted channel specific snippets pages, one at a time to each view and having the model repository act as a server in between gestures. Submit result into polling all the views before submitting to the backend. Alternatively, multi-modal can be obtained by automatically adding synchronization tags or naming convention and proceed as described above.

In another approach, the application is authored by writing explicitly the presentation associated to each channel and adding synchronization information, but already binding the two presentations to a common data model.

In particular cases of these multiple authoring synchronization approaches, it is possible to rely on specific events (e.g. Declaratively declared events, DOM events and future device-independent events) and their associated event handler in such a manner that every time a synchronization must occur due to one modality, an event is thrown and caught by the other modality (as an event handler) that appropriately updates the other modality and take the appropriate action as specified by the handler. As such, it is possible to significantly modify the behavior or fully specify the synchronization. A direct example of this is a voice module (e.g., generated from VoiceXML) to XHTML that would follow the principles of modularization of XHTML and use XHTML events associated to XHTML to be passed to a Voice browser, wherein a VoiceXML fragment would be passed along or earlier. Its execution would comprise the "event handling mechanism". Similarly, we can consider an implementation VoiceXML browser producing voice events that are passed to a XHTML browser that would then "handle the event" on the XHTML side.

In a co-browser type of architecture, the information is exchanged between the different modality-specific browsers, even if a common data model is present in one of the browser. In a MVC DOM architecture, the events flow from one view browser to the model (MM Shell/Interaction manager) where the event handler is executed and as a result one or multiple view are updated, then from the model to the other view. The update may be only a presentation update (DOM manipulation) or also DOM events that are passed to the view and handled at the level of the view by a event handler (e.g. Script, java, etc.). It is possible that in some implementations, one of the browsers also comprises the model. This may result into a behavior that appears to be co-browser, but it is fundamentally MVC. Returning to the above example of a Voice module for XHTML, it is possible to introduce a Xforms (or iML/Xforms) layer bound to the Voice and XHTML module. Accordingly, the naming convention and events coming from the different browser results into an update of the interaction logic layer instance (logic and data model instances). However, it is possible to define additional events to be communicated via the DOM interface to the MM Shell where event handler can be written at the level of the interaction logic layer. Execution of the processing at that level (declaratively, scripts or java code) will result into updates of the interaction instance that can then be reflected in the different views (unless if prevented by the programming of the events). The events, event handlers, etc., may also rely on Xlink to explicit specify conditional processing and bifurcation.

To support the second paradigm above for the Voice and XHTML module example, and the associated browser architectures, it is important to author the application in the Voice and XHTML modules bound to the interaction layer or to author the application in the interaction logic layer and produce such a Voice/XHTML module by producing it by adaptation (using the interaction logic description and the customization meta-data) within the interaction manager.

The challenge of authoring for multiple synchronized modalities is closely related to the issues of device-independent authoring and authoring applications to be rendered in different channels (modalities). With multiple authoring of a multi-modal application, content that is targeted at multiple channels can be created by separately authoring the application in each target channel. Alternatively, various style sheet transformations can be authored to transform (via a transcoder) a common representation (device-independent) into the different target presentation languages. In addition, for multi-modal applications, the developer must also specify the synchronization between the different channels.

With multiple authoring of the target pages, an application composed on M "pages" to be accessed via N devices requires M×N authoring steps and it results into M×N presentation pages to maintain. Generic separation of content from presentation results into non-re-usable style sheets and a similar M×N problem with the style sheets. Using an intermediate format with two-step adaptation calls for M+N reusable transformations to be defined. Appropriate definition of a standard common intermediate format allows the M content-to-intermediate authoring steps or transformations—one for each "page"—to be defined by content domain experts while the N intermediate-to-device transformations can be programmed by device experts. Because of the rate at which new devices are becoming available, the system must be able to adapt content for new devices that were not envisioned when the content was created. In addition, it is important to be able to adapt existing content that may not have been created with this multi-channel deployment model in mind.

Multiple authoring is an even more challenging when synchronization is provided across channels. Indeed, with multiple authoring approaches, the application developer must explicitly author where the different channels (or views) of the applications must be synchronized. This can be done by using explicit synchronization tags (co-visit URL tags that indicate that when reaching this item a new page must be loaded by the other view) or merged pages (where the application is authored by combining snippets from each synchronized modality). Besides having strong consequences on the underlying browser architecture, these approaches lead to combinatorial amounts of authoring: between every pair (or more) of channel to synchronize, or whenever a different granularity level of the synchronization is required.

Thus, an MVC-based multi-modal browser framework according to the present invention can support both single and multiple programming methods. Further, a single authoring programming model (e.g., a model comprising an interaction and data model layer) for representing content is preferred because such a model can provide tight synchronization across various modalities/channels/devices in multi-channel, multi-modal, multi-device and conversational applications. Single authoring programming model provides specialization for a class of channels or a specific channel, and can support different navigation flows.

IV. Preferred Features and Characteristics of a Multi-Modal Browser

In general, based on the discussion in the previous sections and our experience with multi-channel, multi-modal and conversational applications, the following is an outline of preferred features that are incorporated within multi-modal browsers/platforms, as well as preferred interfaces and communication protocols. Preferably, a MVC-based multi-modal browser framework provides the capability for the user to readily switch between various modalities at any time and seamlessly continue the transaction, when the authoring method and the level of synchronization granularity authorizes it. A multi-modal browser framework supports multi-channel usage even when a user utilizes only one modality and further supports multi-channel/Multi-modal transaction persistence.

Preferably, a multi-modal browser architecture minimizes the risk of inconsistent user interfaces by guaranteeing that the different views are always in a same or consistent state within the limits of the supported level of synchronization granularity.

A preferred multi-modal architecture allows the use of channel specific browsers, without code change (e.g., no modification of the channel specific presentation language; and supports re-use of existing content formats) and minimizes the amount of new components to place on a client (especially for thin client configurations). A preferred architecture employs interfaces and protocols that are standard-based, e.g., DOM for browser interface; DOM and Generalized XHTML event specifications, SOAP, SynchML etc., or any other suitable standard for transport of the synchronization events and messages (e.g. HTTP+TCP/IP). As discussed above, the interface preferably supports manipulation of the DOM tree and access to the events. This is all that is needed for a local MVC DOM implementation. When distributed, these manipulation and access to events should be feasible remotely. For remote applications, SOAP is prefeably used to implement a remote DOM. However, any other approach that can support remote DOM may be implemented.

A preferred architecture further supports different authoring methodologies as described above. For instance, the architecture supports a Multiple authoring framework using, e.g., co-visit synchronization tags, naming conventions, and/or merged modality specific pages, as well as the mulitple authoring versions of a Voice Module for XHTML (with or without an explicitly bound interaction logic layer). In addition, a preferred architecture supports a single authoring framework, inlcuding support for a XHTML voice module as described above that would be generated at adaptation by the interaction logic layer and customization. Preferred multi-modal browser architectures, interfaces and protocols provide support for multiple levels of synchronization granularity based on, e.g., user settings, application settings, browser capabilities, network capability, content provider and device capabilities.

Further, similar interfaces and architectures are preferably employed to support different multi-modal browser configurations according to the present invention which simply become implementation choices. Further, similar interfaces and architectures for building a multi-modal browser according to the present invention are preferably usable across all networks and for all modalities. For instance, there should be no differences between WAP, i-mode and web browsers, and immediate support should be afforded to different configurations, e.g. VoiceXML and HTML and VoiceXML and WML, etc.

A multi-modal browser according to the present invention preferably supports spontaneous networking of views, wherein views may be dynamically added or disappear, and more than 2 views can be supported.

A multi-modal browser according to the present invention preferably supports various degrees of "Suspend and Resume" as outline below (some of these may be mutually exclusive):

I. Changes or no change of access mechanism between suspended and resumed access:
   (a) Same channel (same device and user agent);
   (b) Same device, different channels (e.g. from WAP browser to Voice access on same phone);
   (c) Different devices, same channel type (e.g. from WAP browser on one device to WAP browser on another phone); and
   (d) Different devices and different channel types (e.g. HTML access on a PDA to Voice access on a phone).

II Origin of the suspend:
   (a) User initiated;
   (b) System initiated (i.e. programmed within the application to impose this switch); and
   (c) Unpredicted and non-initiated.

III Nature of the suspend:
   (a) Clean (i.e. interaction manager is notified and latest interaction state is updated and saved before suspension);
      (i) Server can be notified and aware of the suspension; and
      (ii) Server can be not notified or aware of the suspension;
   (b) Unclean (i.e. Server does not have latest update of the interaction state);

(i) Server is not notified or aware of the suspension; and
(ii) Server is notified and aware of the suspension but still does not receive the latest interaction state update.

IV Nature of the resume:
  (a) Initiated by the user;
    (i) Manually (e.g. by entering a URI request or dialing in);
    (ii) Automatically by the device/user agents (e.g. by a script);
  (b) Initiated by the server (i.e. Push, SMS, Server initiated voice call).

V Resume expectation:
  (a) Expected and with minimized delays (immediate)—also defined as sequential multi-modal;
  (b) Uncertain and possibly with long delays—also defined as transaction or session persistence;
    (i) User may never reconnect;
    (ii) Immediacy is not an issue.

For speech distributed configurations, preferred architectures, interfaces and protocols that are employed with a multi-modal browser preferably support voice transport via voice channels as well as data channels (e.g., VoIP (Voice over Internet Protocol). Voice transport protocols, which are used for transmitting voice for server-side processing, can be a conventional voice transport protocol, conventional voice over IP or DSR (distributed speech recognition codecs and protocols (as described below). Voice protocols are preferably compatible with current and future wireless and IP networks.

In addtion, preferred multi-modal browser frameworkes according to the present invention should meet the requirements of the W3C Multi-modal Requirements for Voice and multi-modal Markup Languages.

Various multi-modal browser frameworks that implement the above features will now be described in detail.

V. Multi-Modal Browser Architectures:

In general, a multi-modal browser architecture according to the present invention implements a MVC-based framework as described above to support synchronization of applications across various channels or devices. Further, a multi-modal browser preferably implements at least a Level 2 (or higher) DOM (document object model) interface in accordance with the specifications of the W3C, which adds methods for filtering and advanced navigation to the object model (see, e.g., Document Object Model (DOM) Level 2 Core Specification, Version 1.0, W3C Recommendation 13, November, 2000, http://www.w3.org/). Advantageously, as explained below in further detail, the use of a DOM interface enables the implementation of a multi-modal browser using conventional channel-specific browsers (e.g., HTML, XHTML-MP and WML browsers) without requiring changes to the program code of such channel-specific browsers. Even when they require change of the code (e.g. VoiceXML DOM is not addressed today by standard organizations), access is needed to the functionality of DOM and this is a efficient and universal mechanism for exchanging events and manipulation the presentation layer. It is therefore preferred in any case.

Further, an MVC-based multi-modal browser according to the present invention is extremely modular and flexible, wherein the components of a multi-modal browser can be structured to enable a a client only topology (fat client approach) or various distributed topologies (thin client approach).

Note that in the case that a View is not a browser application (i.e. not a declaratively authored document, but rather a java, DCOM etc.), it is preferred to expose a DOM look-alike interface to achieve the same capabilities: DOM events for all the UI and logical events resulting from the interaction with the user or local changes in the state or presentation layer and DOM-like functions that enable external and remote manipulation of the presentation associated with the application. Similar interfaces have been partially provided by accessibility efforts (primarily to get the events) like the Java and ActiveX accessibility packages.

Figure 4:
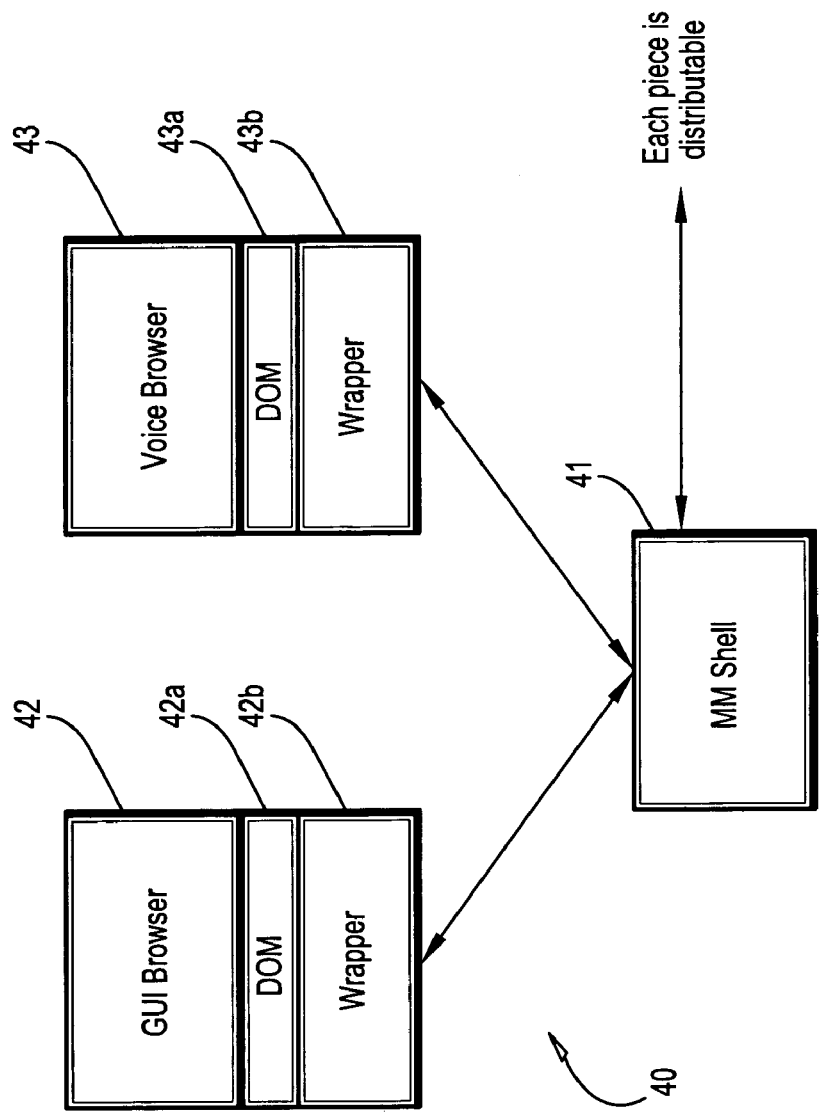
FIG. 4 is a diagram of an MVC-based multi-modal browser according to an embodiment of the present invention.

FIG. 4 is a diagram of a multi-modal browser architecture to an embodiment of the present invention. A multi-modal browser 40 comprises a multi-modal shell 41 which comprises a Model in the MVC framework. As explained in further detail below, the multi-modal shell 41 preferably maintains the state of the application, manages the synchronization between the supported Views, and/or manages the interface with the backend. The multi-modal browser 40 further comprises a GUI browser 42 and associated DOM interface 42a and wrapper layer 42(b), as well as a voice browser 43 and associated DOM interface 43a and wrapper layer 43(b). It is to be understood that notwithstanding that two channels are shown in FIG. 4, additional channels can be supported, especially in the case of multi-device applications.

The GUI Browser 42 comprises any conventional GUI browser, including, for example, an HTML, WML, XHTML Basic, XHTML MP, HDML or CHTML browser. The GUI browser 42 comprises a GUI "View" in the MVC framework described herein. The Voice Browser 43 preferably comprises a VoiceXML browser that is capable of interpreting and rendering content according to the VoiceXML standard. Other specifications may be considered. The voice browser 43 generates a speech "View" in the MVC framework described herein.

Preferably, the DOM interfaces 42a and 43a provide mechanisms to enable the GUI browser 42 and voice browser 43 to be at least DOM Level 2 compliant. The DOM interfaces 42a and 42b for each View comprise supporting mechanisms for controlling the browsers 42, 43 and mechanisms for event notification. Further, in one embodiment, each wrapper 42b, 43b comprises interfaces and filters to the different views (browsers) (e.g., the wrappers implement a DOM filter and interfaces). The wrappers 42b, 43b support granularity of the synchronization between the different channels by filtering ad buffering DOM events. Further, the wrappers 42b, 43b preferably implement the support for synchronization protocols. The synchronization protocols refers to protocols for synchronizing the browsers 42, 43 as described herein. In one embodiment, page push and pull functions are implemented using HTTP or WSP. In other embodiments, the synchronization protocols are supported by a separate module. Preferred synchronization protocols are described in further detail below in Section VII In all embodiments, the wrappers 42a, 43a, and/or the synchronization protocols implement the information exchange behind the MVC framework: when the user interacts on a View (via a (controller) browser), the action impacts the Model (supported by the multi-modal shell 41) that updates the Views.

A discussion of an exemplary operation of the multi-modal browser 40 will now be provided. The components of the multi-modal browser 40 can be loaded in thin client, fat client, hybrid multi-modal or in multi-device configurations. It is assumed a configuration has been selected and established and that registrations, if needed, have taken place.

Initially, a page is loaded in by the multi-modal shell 41. Depending on the authoring method, the multi-modal shell 41 immediately extracts, e.g., the VoiceXML and XHTML-MP page to send to each view 42, 43 or it adapts the incoming page into such pages. The multi-modal shell 41 loads via the DOM interfaces 42*a*, 43*a*, the pages to their respective registered views: XHTML-MP to the GUI (e.g., WAP) browser 42 and VoiceXML to the speech browser 43.

Assume that the loaded application is designed to collect from the user his first name, last name and address. Assume further that the user enters his first name via the GUI (WAP) browser 42 (user action). Each DOM event, associated with the node identity is passed through the browser's DOM interface 42*a* to the wrapper 42*b*. Depending on the settings, the wrapper 42*b* (which performs event filtering and transmission) may directly pass all the events to the multi-modal shell 41, filter some events or buffer the events and pass after a duration criteria is met or after receiving a DOMFocusOut event.

The multi-modal shell 41 then updates the instances of its application state (filled first name and data model update) based on the node identity and nature of the event. As more information must be collected before submitting the form, the multi-modal shell 41 updates the Voice browser 43 by setting the guard variable to the first name value. This is done through the VoiceXML DOM interface 43*a* (using a specified, proprietary implementation).

If the user agent respects the requirement set in to update its focus when instructed, the multi-modal shell 41 can update at the same time the XHTML-MP page to set the focus on the last name input field. Otherwise, no DOM update is provided on the GUI side.

The VoiceXML execution model implies that the speech browser now asks "what is your last name".

The (XHTML) browser 42 is ready to fill the last name, or the user must navigate to that field. The user can also decide to say the last name or to answer another field. This last feature may require support of free flow conversational features by the voice browser 43.

If the application is authored via single authoring, then when a DOM event reaches the multi-modal shell 41 (or interaction manager), the shell 41 inspects its interaction logic layer description (as authored by the programmer). On that basis, the interaction manager may decide to only update its application interaction model and propagate DOM data manipulation (DDM). In that, case the multi-modal shell 41 will not adapt anything. It may also decide to perform a DTM data tree manipulation and change the presentation structure (change focus, remove a dialog, etc. . . . ). This is especially true if the interaction manager performs a dialog management function. In such a case, a dialog manager may change the dialog in focus and remove parts of the dialog, etc. Typically, this results into getting new snippets of presentations (presentation fragments) pushed to the views to update, the snippets are generate by adaptation strategies.

If the application is authored via multiple authoring (with a binded interaction logic layer or with a pseudo deducted by the interaction manager), the application does not adapt anything to generate the presentation. It may still use a strategy to extract and upload the right presentation fragment but this is different from actually generating it with an adaptation strategy.

Currently, there are no standards for VoiceXML DOM and WML DOM or XHTML-MP DOM specifications interfaces and implementations. Based on the teachings herein, however, one skilled in the art can readily appreciate and envision various frameworks for construction multi-modal browsers using DOM functions and interfaces (or frameworks similar to DOM), while promoting stable specifications and wide support.

It is to be further appreciated that any suitable interface (other than DOM) may be employed with the browsers 42, 43 to provide access to the UI events and to provide support for updating the state of the browsers 42, 43. Preferably, to enable tight synchronization, such interface is similar in functionality to DOM and provides support for events such as DOM events and generalized XHTML events. It is to be appreciated that the richness of such interface can vary depending on the level of browser synchronization that a developer want to achieve when building a MVC multi-modal browser. In the sequential case (suspend and resume within or across modalities) it is quit possible not to have any DOM exchanges. However, DOM support is desirable. This is illustrated as follows.

In the presence of a DOM interface (remote), it is possible to continuously update the interaction manager (multi-modal shell 41) about the interaction from the user. This enables suspend and resume at any time, whether it is explicitly communicated by the user to update the interaction instances or not. In the absence of a DOM interface (remote), it is not possible for the user to communicate the latest interaction. The only way is to fake the disconnect by imposing the disconnect via a virtual submit: a button or command that once clicked or activated (for example by voice), updates submits the data model and/or interaction state/history before disconnecting. This requires a manual disconnect. If the network connection is list, for example, and the virtual submit did not occur, the latest version/updates of the interaction state is lost and the user will have the resume at the latest update point. One way around this is to put period hidden virtual submit where the user agent/view browser submits its interaction instance to the multi-modal shell. In the case of non manual explicit disconnect, the user can resume at the level of the latest virtual submit.

A scenario includes the case of a manual disconnect where the user disconnects from a WAP session by clicking a disconnect button (soft button). This runs a script that first submits the current state of the forms/data model/interaction instances then disconnected. Possibly, this is done with a script that can then (via the telephony APIs) dial a number to reach the voice server to continue in voice mode. With DOM, the instance is updated on the server all the time. When disconnecting, if manual, the user may be able to use a script to end the data connection and call the voice server or he would have to dial the number himself. The user would always be able to resume the interaction with the application where he/she left it.

The case in which the interaction instance is replicated would allow the user that loses a voice connection to continue in GUI only locally for submission when the connections returns.

The suspend and resume is mostly a scenario for current phones and networks. However, with a 2.5 G or 3 G (always on/Voice and a data support) case, it will be possible to still use the sequential usage of the system. In that case it is not needed to interrupt data calls and go in voice calls and conversely. There, the value of DOM is even greater as it would guarantee that the model is always up to date whenever the user decides to switch to start using the other modality. Of course, this would also enable other finer granularity of synchronization. Depending on the authoring method, the selection of what modality can be used for a particular interaction may be left to the user or imposed by the author (that may impose the switch between a GUI interaction for a while and a speech modality later etc.).

As noted above, the multi-modal shell 41 comprises the Model in the MVC framework described herein. The multi-modal shell 41 processes modality-independent documents (e.g., iML documents/applications) retrieved over a network (e.g., Internet) from a content server, or applications authored by multiple authoring as described herein Even in a multi-channel implementation, the shell 41 can process an application not written in a single authoring.

In a preferred embodiment, the multi-modal shell 41 maintains the state of the application (e.g., iML application), manages the synchronization between the supported browser Views, and manages the interface with the backend access to the content server. Various embodiments of a multi-modal shell 41 according to the present invention are described in Section VI, for example.

Figure 13A:
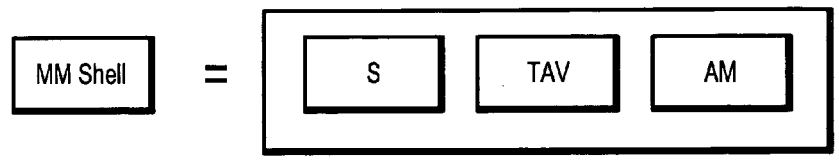
FIGS. 13*a*–13*d* are diagrams illustrating various methods of distributing a multi-modal shell according to the present invention.

In one preferred embodiment as depicted in FIG. 13a, the multi-modal shell 41 comprises an Application Model ("AM") manager, a Transformation/Adaptation/View preparation ("TAV") module, and a Synchronization ("S") manager. The AM manager comprises mechanisms for, e.g., maintaining the dialog state of an application, determining the next page, and determining the next update. The TAV module performs functions such as page retrieval, page caching, and page parsing. Further the TAV module performs page preparation and page transformation of full pages and/or page snippets. The Synchronization manager comprises mechanisms for providing notification of I/O events and transport events to each supported browser, managing page push operations to the supported browsers, and managing DOM updates from the supported browsers. Depending on the implementation choice, these functions can implemented using a HTTP (or WSP) module to exchange new page requests and new pages and another module to manage the exchange of the DOM events and control messages.

In one preferred embodiment, the multi-modal shell comprises a repository of the application state (dialog/interaction), and comprises mechanisms for maintaining context and past history to enable multi-modal conversational applications (dialog management). In other embodiments, the multi-modal shell functions as a virtual proxy, wherein the multi-modal shell supports synchronization of the different Views as a Web intermediary or proxy, but does not maintain the state of the application. A multi-modal shell can also be used to synchronize multiple devices and enable multi-device browsing.

The MVC multi-modal browser 40 preferably supports synchronization of applications at multiple levels (e.g. page level, slot level, interaction component level or event level). The wrapper layer (e.g., layers 42b, 43b FIG. 4) comprises a mechanism for filtering events to adjust to the desired granularity level of synchronization. Filtering may be based on the nature of the events (some events are passed or some events are not passed), delays (wait and buffer for a while) or waiting for particular events (Focus OUT or focus in on another item etc.) The wrapper may also support the interface to remote DOM for remote manipulation of the DOM interface. This may be done via DOM or using other methods.

It is also possible that the wrapper can be programmed (dynamically or statically) to preprocess the events before sending them to the shell or preprocessing and filtering the DOM manipulation (or incoming events for example in the case of a voice XHTML module). This preprocessing could also be programmed (dynamically or statically).

The MVC architecture provides automatic support of different level of granularity when applications are developed with single authoring, in which case, only the wrapper is modified to filter more or less events. Indeed, multi-modal applications based on single authoring do not assume any synchronization level. Synchronization is implicit as each view originates from a common representation. It is to be further appreciated that a MVC multi-modal browser framework supports multiple authoring approaches. In fact, specialization steps of the single authoring programming model can also include specialization of the synchronization with explicit tags.

U.S. patent application Ser. No. 09/507,526, filed on February 18, entitled: "*Systems And Methods For Synchronizing Multi-Modal Interactions*", which is commonly assigned and fully incorporated herein by reference, describes architectures and protocols which can be implemented herein for building a multi-modal shell. A multi-modal shell according to the present invention can be employed for constructing local and distributed multi-modal browser applications. The multi-modal shell parses and processes multi-modal documents and applications (e.g., based on iML) to extract/convert the modality specific information for each registered channel specific browser. A multi-modal shell can also be implemented for multi-device browsing, to process and synchronize views across multiple devices or browsers, even if the browsers are using the same modality. When not limited to a browser, but to other "views", the multi-modal shell preferably comprises a registration table that allows each channel specific browser application to register its state, the commands that it supports, and the impact of such commands on other modalities. Such registration may also include any relevant arguments to perform the appropriate task(s) associated with such commands.

The multi-modal shell coordinates and synchronizes the information exchange between the registered channel-specific browser applications via synchronization protocols (e.g., Remote DOM or SOAP). After the multi-modal shell parses a multi-modal application/document, the shell builds the synchronization between the registered browser applications via the registration table (i.e., the interaction logic layer DOM Tree and associated instances that include data model and interaction plus possible the interaction history) and then sends the relevant modality specific information (e.g., presentation markup language) comprising the multi-modal application/document to each registered browser application for rendering based on its interaction modality.

The use of a single authoring, modality independent application (e.g., gesture-based IML as described above) together with a multi-modal shell according to the invention advantageously provides tight synchronization between the different Views supported by the multi-modal browser. However, this is not required since it is possible to build a pseudo interaction logic layer from the synchronization information that can at least be able to handle the synchronization process.

Techniques for processing multi-modal documents (single and multiple authoring) via multi-modal browsers are described in the above-incorporated patent applications U.S. Ser. Nos. 09/507,526 and 09/544,823. For instance, in one embodiment, the content of a single authoring multi-modal document can be transcoded/transformed to each channel/modality (e.g., VoiceXML and WML) supported by the multi-modal browser using XSL (Extensible Stylesheet Language) transformation rules (XSLT). Using these techniques, an iML document, for example, can be converted to an appropriate declarative language such as HTML, XHTML, XHTML-MP or XML (for automated business-to-business exchanges), WML for wireless portals and VoiceXML for speech applications and IVR systems. This is an example of single authoring for multi-channel applications. The XSL rules are modality specific and in the process of mapping iML instances to appropriate modality-specific representation, the XSL rules add the necessary information needed to realize modality-specific user interaction.

Advantageously, the architecture of FIG. 4 enables the implementation of a multi-modal browser using currently existing channel specific browsers by adding a DOM L2 interface, for example, thereby providing a mechanism to extend currently existing browsers without having to modify the code of such browsers. Indeed, the additional interface code preferably comprises a wrapper layer that implements a DOM interface and filter and synchronization protocols. Further, additional code and protocols are required if, for example, the multi-modal browser supports distributed speech processing. It is to be appreciated that it is possible to modularize the components (MM Shell, views) and, thus, possible to have the multi-modal shell as part of the GUI or the Speech browser.

It is also possible to provide browsers that offer interfaces with the same functionality without implementing a full DOM support. This is essentially at the discretion of the browser vendor, especially if it has access to the source code of a GUI browser.

It is to be appreciated that the use of a common Model guarantees consistency of the interface, within the limits of the supported level of synchronization granularity. This is to be contrasted to other multi-modal browser implementations such as co-browser implementations or implementations that add command and control voice interfaces to a GUI application. With co-browser implementations, consistency can not be guaranteed as the views may not be in the same state, and it depends on the assumptions made by the application developer at authoring. With the latter implementation, the voice view is not a fully functional application, it only drives changes of states in the GUI application. At best, the interface can support navigation and select menus. But with today's technology capabilities, such interface can not support most input cases without requiring multiple authoring.

The multi-modal browser framework of FIG. 4 can be distributed. For example, components of the multi-modal browser 40 can be distributed across different systems or devices. In addition, components of the multi-modal shell 41 can be distributed accross different systems or devices. Various embodiments of local and distrubuted multi-modal browser frameworks are described below with reference to FIGS. 5–14, for example. With distributed multi-modal browsers, protocols are employed for encoding voice data, transmitting encoded voice data for server-side speech processing ("voice transport protocols") and for remotely controlling speech engines ("conversational remote control protocols").

Figure 5:
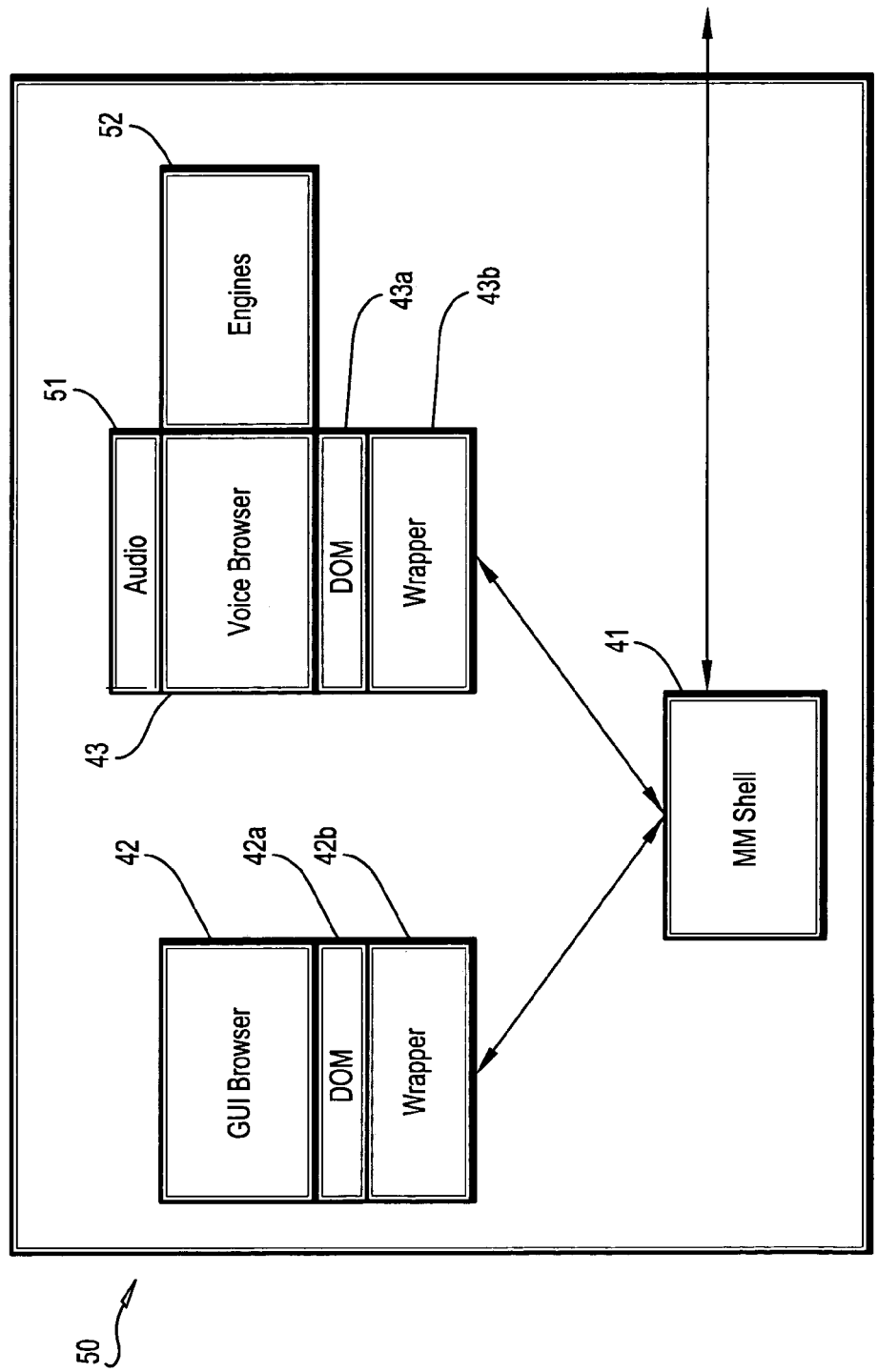
FIG. 5 is a diagram of an MVC-based multi-modal browser according to an embodiment of the present invention using a fat client approach.

FIG. 5 is a diagram of a MVC-based multi-modal browser according to an embodiment of the present invention. The topology comprises a fat client topology, wherein all the functions and modules of the multi-modal browser are located on a client device or machine 50. More specifically, a local (fat) client device 50 comprises a multi-modal browser comprising an architecuture of the multi-modal browser 40 of FIG. 4. In one embodiment, the client 50 comprises a voice application server comprising a voiceXML browser 43, conversational engines 52 (comprising, for example, speech recognition, TTS (text-to-speech), NLU (natural language understanding), NLG (natural language generation) and speaker recognition engines). The audio subsystem 51 captures and encodes voice data for processing by the engines 52, and plays back audion signals and synthesized speech. The audio subsystem 51 supports audio codec protocols for processing voice data (e.g., GSM, VoIP (such as G.711) or DSR (distributed speech recognition codecs) as described below, and comprises audio I/O peripherals (microphone, speaker, etc and other vioce processing systems).

Figure 6:
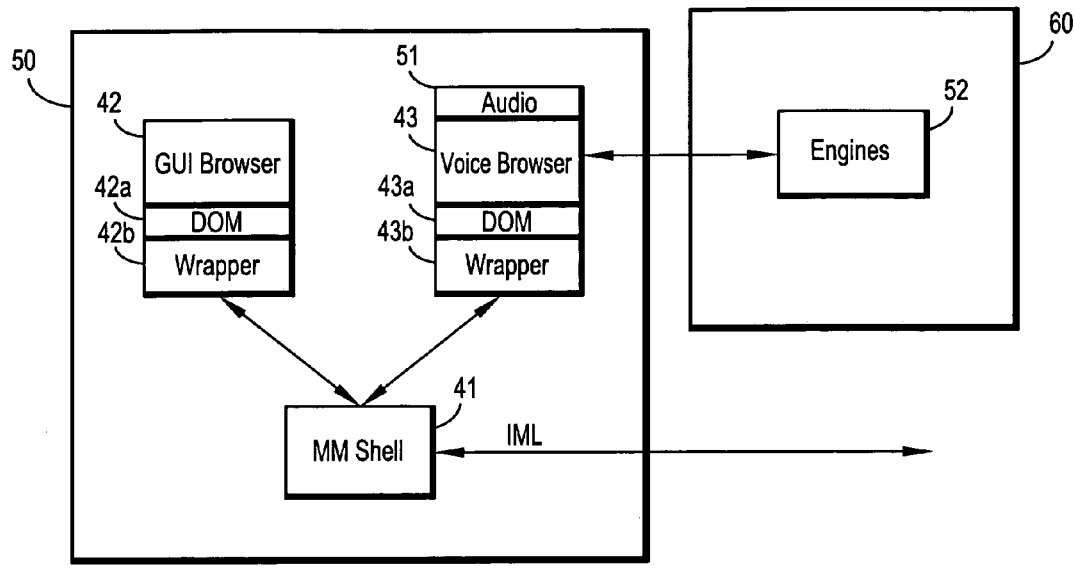
FIG. 6 is a diagram of a distributed MVC-based multi-modal browser according to an embodiment of the present invention.

FIG. 6 illustrates an alternate topology of FIG. 5, wherein the conversational engines 52 are located on a remote engine server 60 and the MVC-based multi-modal browser is located on the client device 50. The audio system 51 is located on the client device 50 and the captured audio is encoded and transmitted to the server 60 suing via voice transport and conversational remote control protocols as described herein. For instance, such protocols may comprises the real-time conversational protocols described in U.S. Ser. No. 09/703,574, filed on Nov. 1, 2000, entitled "Conversational Networking Via Transport, Coding and Control Conversational Protocols", which is commonly assigned and incorporated herein by reference. The protocols described in U.S. Ser. No. 09/703,574 are referred to herein as DSR (distributed speech recognition) codecs and protocols. In one preferred embodiment, the voice browser 43 exchanges information with the remote conversational engines 52 using DSR codecs and protocols.

Figure 7:
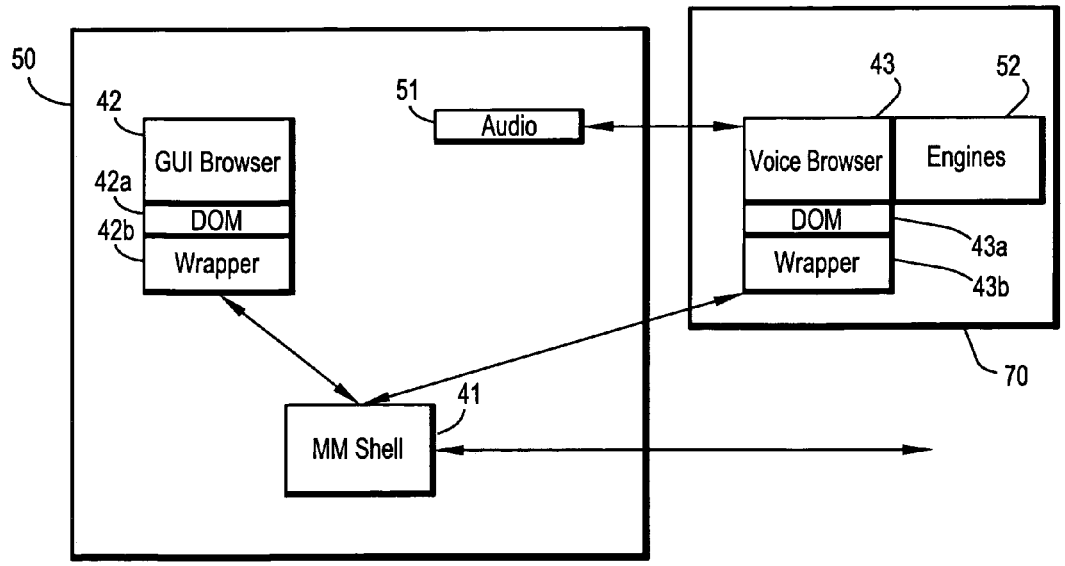
FIG. 7 is a diagram of a distributed MVC-based multi-modal browser according to an embodiment of the present invention.

FIG. 7 is a diagram of a distributed multi-modal browser according to another embodiment of the present invention. The distributed MVC multi-modal browser framework of FIG. 6 comprises a speech application server 70 comprising the voice browser 43, associated DOM 43a and wrapper 43b layers, and engines 52. The audio system 51 is located on local client 50. The audio and audio events can be exchanged between the speech application server 70 and the audio system 51 and multi-modal shell 41 as voice assuming the network supports voice and data or as data using, e.g., DSR as described below.

Figure 8:
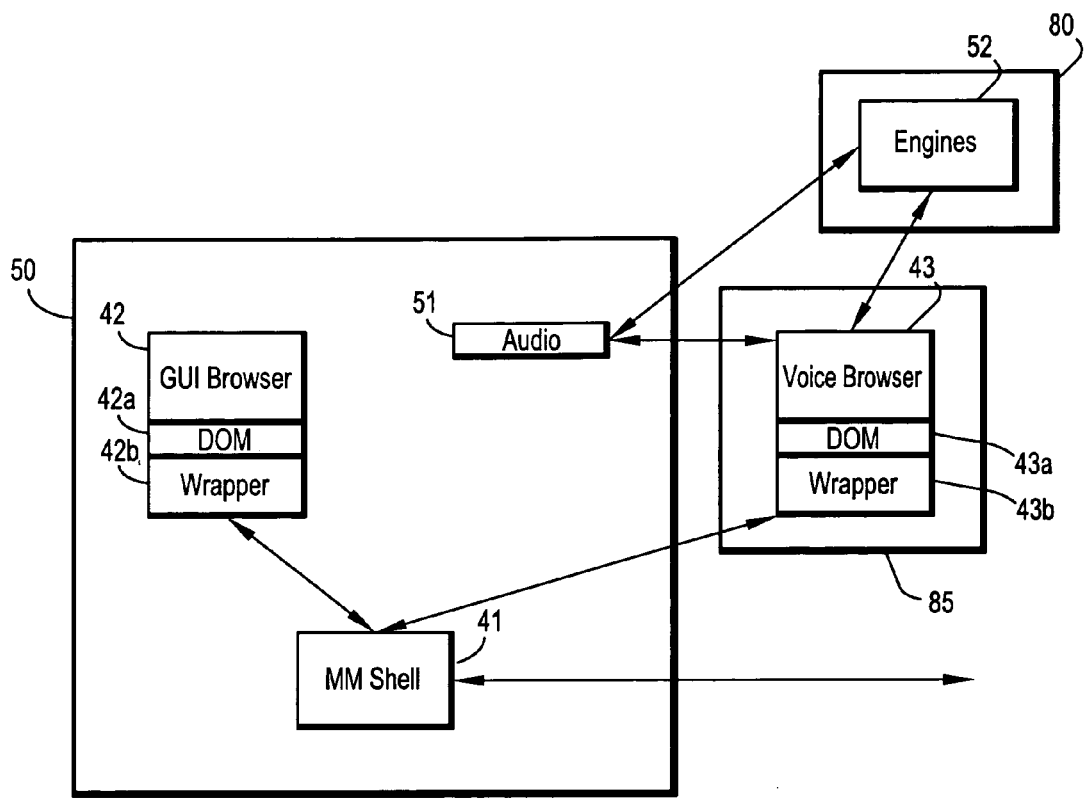
FIG. 8 is a diagram of a distributed MVC-based multi-modal browser according to an embodiment of the present invention.

FIG. 8 is a diagram of a distributed multi-modal browser according to another embodiment of the present invention. The embodiment of FIG. 8 is similar to the embodiment of FIG. 7, except that the speech application server is further distributed over servers 80 and 85. The engine server 80 comprises the distributed conversational engines 52 and the voice browser 43 and associated interface layers 43a, 43b are located on server 85. Again, as explained herein, communication protocols are employed to exchange voice data and control data between the audio subsystem 51 and multi-modal shell 41 located on the local client 50 and the voice browser 43. In addition, the engine server 80 and server 85 employ protocols to exchange information between the voice browser 43 and conversational engines 52.

Figure 9:
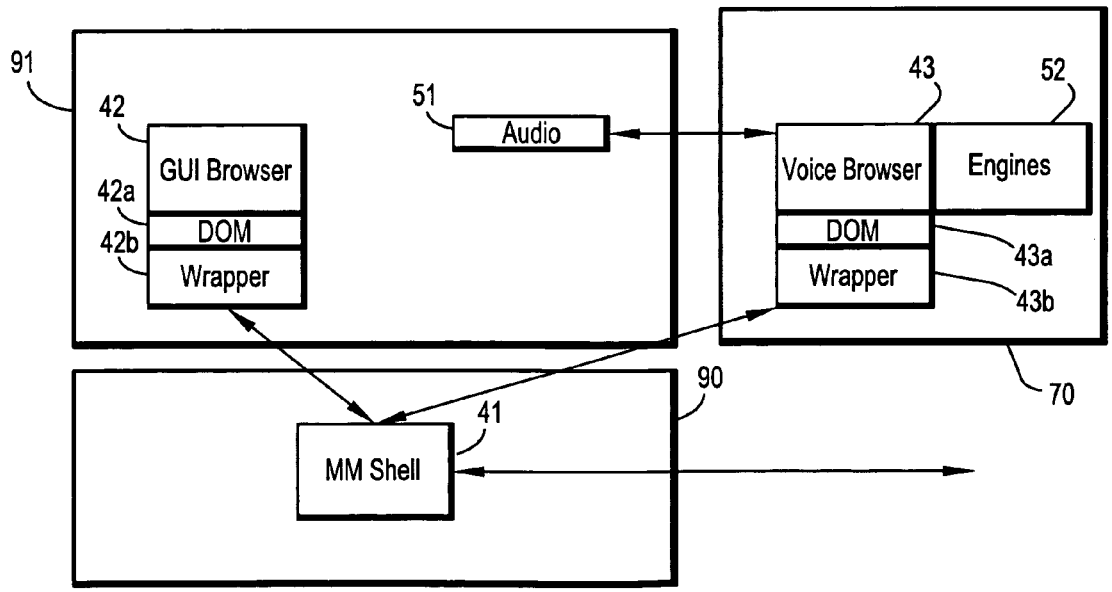
FIG. 9 is a diagram of a distributed MVC-based multi-modal browser according to an embodiment of the present invention.

FIG. 9 is a diagram of a distributed multi-modal browser according to another embodiment of the present invention. The embodiment of FIG. 9 is similar to the embodiment of FIG. 7, except that the multi-modal shell 41 is remotely located on device 90.

Figure 10:
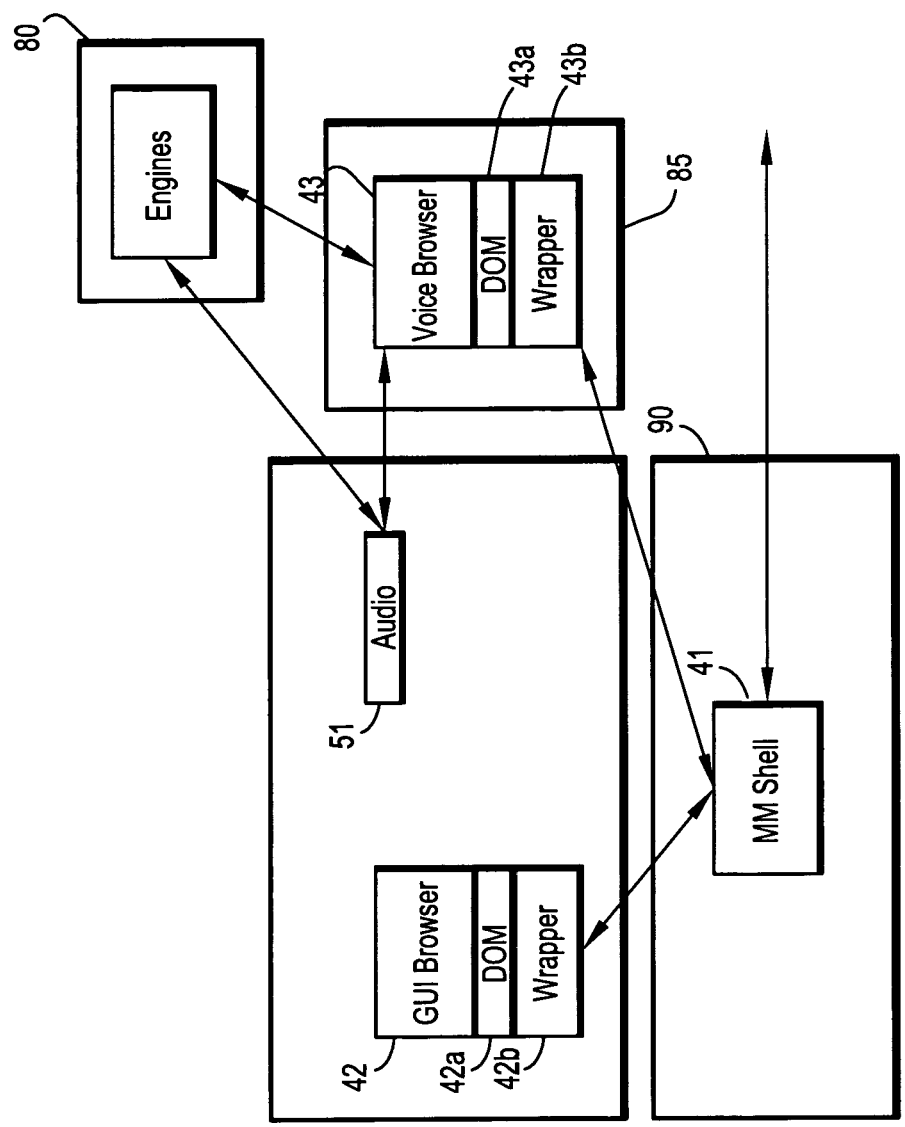
FIG. 10 is a diagram of a distributed MVC-based multi-modal browser according to an embodiment of the present invention.

FIG. 10 is a diagram of a distributed multi-modal browser according to another embodiment of the present invention. The embodiment of FIG. 10 is similar to the embodiment of FIG. 8, except multi-modal shell 41 is remotely located on device 90.

Figure 11:
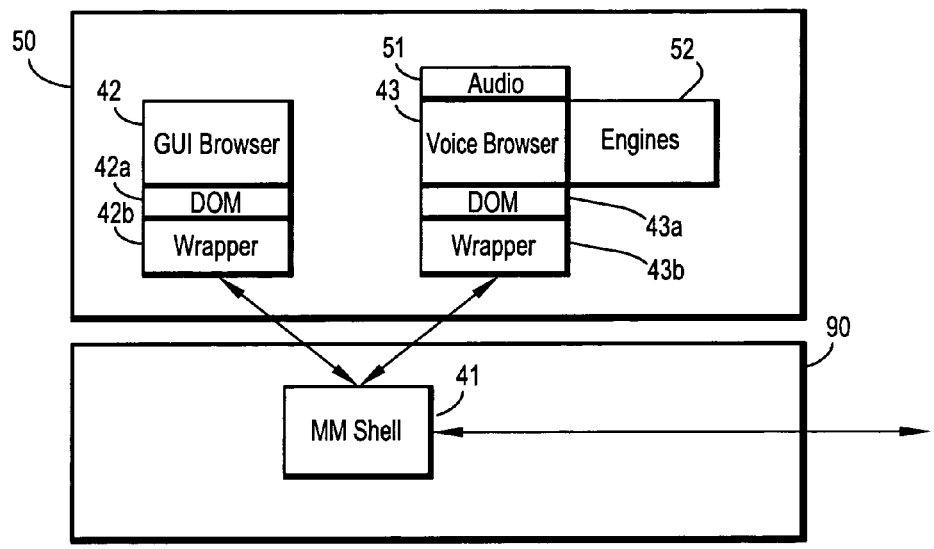
FIG. 11 is a diagram of a distributed MVC-based multi-modal browser according to an embodiment of the present invention.
Figure 12:
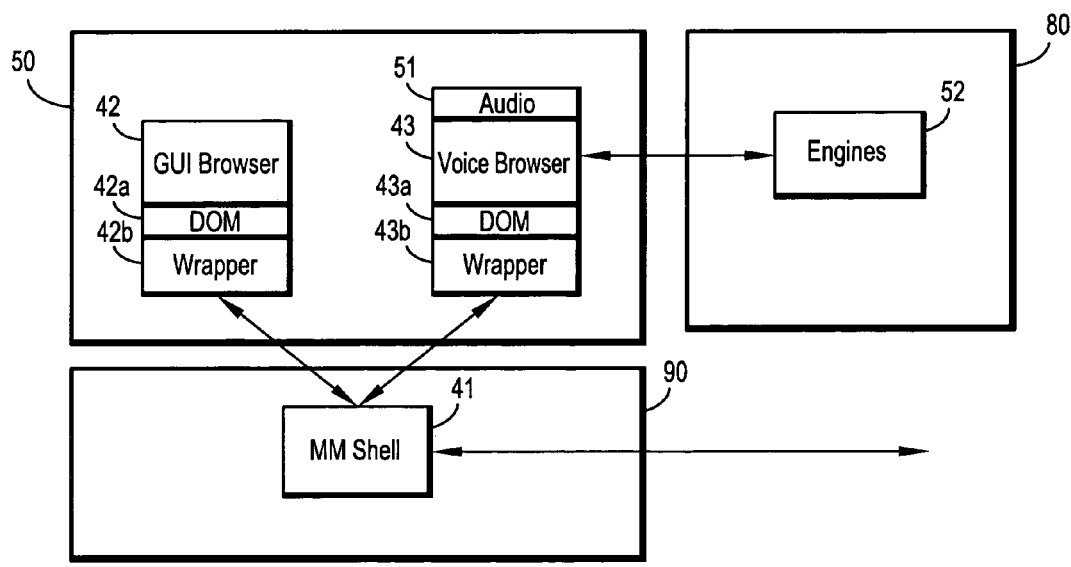
FIG. 12 is a diagram of a distributed MVC-based multi-modal browser according to an embodiment of the present invention.

FIGS. 11 and 12 illustrate alternate topologies comprising a distributed MVC-based multi-modal browser. In FIG. 11, the multi-modal shell 41 is distributed and located on device 87 and the channel specific browsers 42, 43 are located on the local client 50. In FIG. 12, the engines are further distributed. 12 illustrates a distributed multi-modal shell and distributed conversational engines with loca channels specific browsers.

Figure 27:
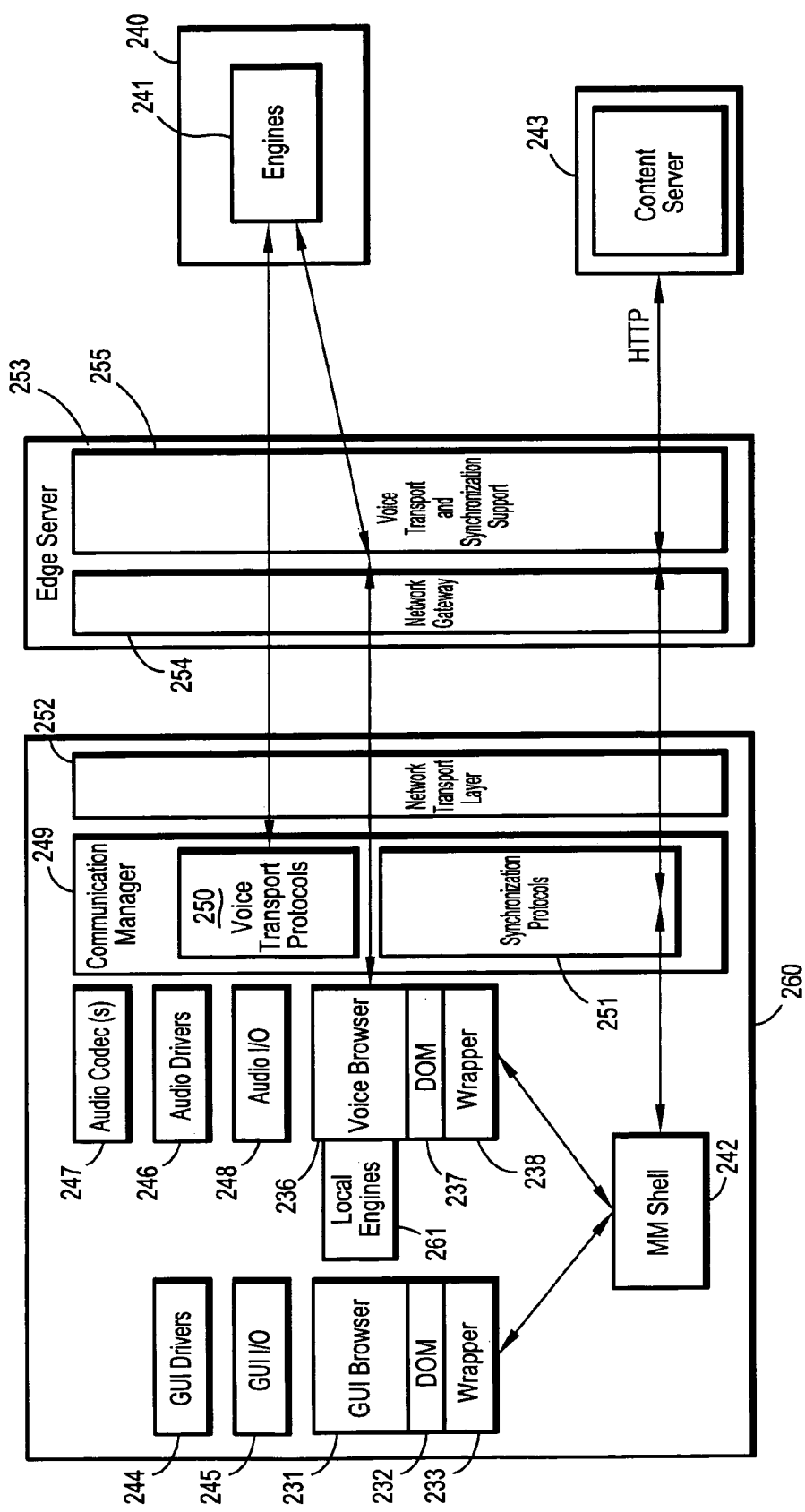
FIG. 27 is a diagram of a multi-modal browser framework according to an embodiment of the present invention.

The topologies illustrated in FIGS. 5 and 6 are preferred topologies for WAP wireless (e.g., WAP or 3G(3GPP)) fat clients. The toplogies illustrated in FIGS. 7 and 8 are preferred topologies for thin client approaches that fit the current WAP client model with the application state located in the client as opposed to a server. The topologies illustrated in FIGS. 9 and 10 are preferred topologies for WAP and other 3G thin clients. Other configurations such as shown in FIGS. 11 and 12 may be implemented for other applications but they are not expected to be widely useful for the wireless Internet (WAP, i-Mode etc.). In other embodiments of the present invention, hybrid configurations of a multi-modal browser may be implemented wherein both local and distributed conversational engines can be used depending on the task to perform. Both the local and remote engines can be simultaneously used and an additional negotiation step is employed to arbitrate the recognition results. For example, the multi-modal browser shown in FIG. 27 and discussed below comprise local and remote speech processing.

VI. Multi-Modal Shell Architectures

In a preferred embodiment, a multi-modal shell (or interaction manager) comprises a middleware component that manages the interaction logic and supports multipurpose access. The interaction manager handles the diversity of delivery context and is extensible in functions—the same client can be used with different interaction managers/MM Shells that differ by providing different combination or evolution features. In addition, an interaction manager comprises logical server-side middleware. An interaction manager may comprise client middleware (on a same client: fat client configuration) on different clients: Multi-device (with no common server to synchronize). The DOM design allows fat client to operate as thin client with a server-side multi-modal shell/interaction manager.

An interaction manager according to the present invention provides functions such as multi-channel access (can generate a functional presentation for any access channel/delivery context or customized presentations for supported channels for which the author has added the necessary customization meta-data (case of single authoring) or has authored a presentation (multiple authoring). In addition, an interaction manager offers multi-channel session persistence (within and across channels: a user can interrupt a transaction and continue in another modality etc.)

Further, an interaction manager provides multi-modal/Multi-device synchronization including for example, sequential (i.e. Suspend and resume mode), page level, block level (page fragments), slot level (gesture by gesture or dialog turn by dialog turn), event level/simultaneous and merged input (simultaneous voice and GUI input to time stamp and address as a single input).

An interaction manager provides dialog management: navigation flow through the interaction logic, disambiguation, focus detection, context management, error recovery etc, and interaction state replication (connected/disconnected mode, multi-device). The interaction logic layer instance (data model and interaction instance produced by single authoring or derived from a synchronized multiple authoring application) can be stored and replicated across different MM shell/Interaction managers. This can be done across server-side MM shells (for example in the case of multi-channel channel session persistence, the application may be sent to a new MM shell when the session resumes for example for load balancing reasons), between client and server to allow connected/disconnected use or switch between fat client and thin client configuration: the interaction instance is exchanged between the server-side MM shell and the client side MM Shell, or between clients to allow dynamic/spontaneous networking between different devices (in different configurations with devices appearing and disappearing). in multi-device mode.

An interaction manager provides discovery and binding, whereby clients or views/browsers are dynamically discovered and connected to. Conversely, a view can dynamically discover and negotiate their MM shell/interaction manager. In addition, an interaction manager provides server-initiated client manipulation, whereby the server performs an action that updates the presentation (and possibly data model and control if these are available and manipulable) on a client. The way that synchronization is performed via DOM is one example. Pushing pages/messages/page fragment updates to the device is another example of such a capability. In the case where the device is really just the user interface for a more complex application environment (e.g. A java virtual machine or another execution environment running on the server) and executing applications, the client only provides access to the interaction by the user and can have its presentation updated. This can include cases that are not limited to what would be considered as conventional browsers. Following this example, an application runs on the server executes the application. The client is only a view (not necessarily a browser) of the execution environment.

An interaction manager further provides component synchronization/coordination and different components and synchronization of the elements of a portlet (i.e. aggregated page fragments).

Figure 13B:
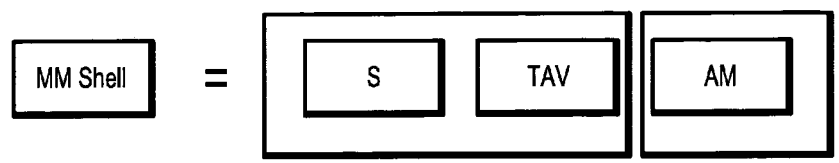
Figure 13C:
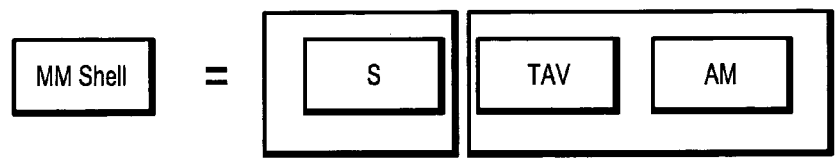
Figure 13D:
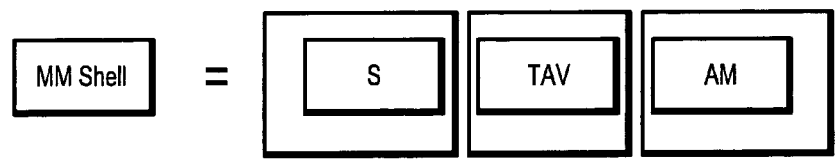

In general, FIGS. 13a–13d are high level diagrams that illustrate various embodiments of a multi-modal shell according to the present invention. FIG. 13a is a diagram of a non-distributed multi-modal shell which comprises S manager, TAV module and AM manager, each having functions as described above. The components and functional modules of the multi-modal shell 41 can be separated and distributed over a network. For instance, FIG. 13b illustrates a distributed multi-modal shell framework wherein the S and TAV components are located on one device and the AM component is located on another device. FIG. 13c illustrates a distributed multi-modal shell framework wherein the S component is located on one device and the TAV and AM components located on another device. Further, FIG. 13d illustrates a distributed multi-modal shell framework wherein each of the S, TAV and AM components are distributed over different devices.

Figure 14:
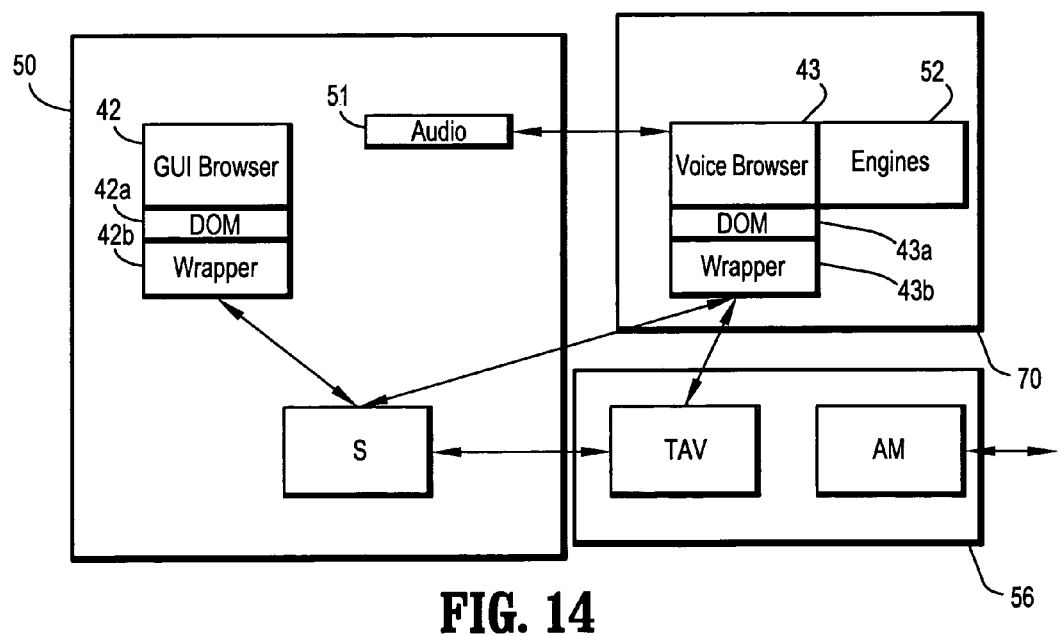
FIG. 14 is a diagram of a distributed MVC-based multi-modal browser according to an embodiment of the present invention.

FIG. 14 is a diagram of a distributed multi-modal browser comprising a distributed multi-modal shell framework. The embodiment of FIG. 14 is an extension of the architecture of shown in FIG. 7, wherein the TAV and AM components of the multi-modal shell are distributed across different devices 55 and 56 as shown (using the architecture of FIG. 13c). In the embodiment of FIG. 14, VoiceXML pages are sent directly to the speech application server 70 via the TAV module in server 56 Another exemplary distributed multi-modal browser framework comprises an extension to the framework shown in FIG. 8 by distributing the multi-modal shell 41 using the method shown in FIG. 13c.

Figure 15:
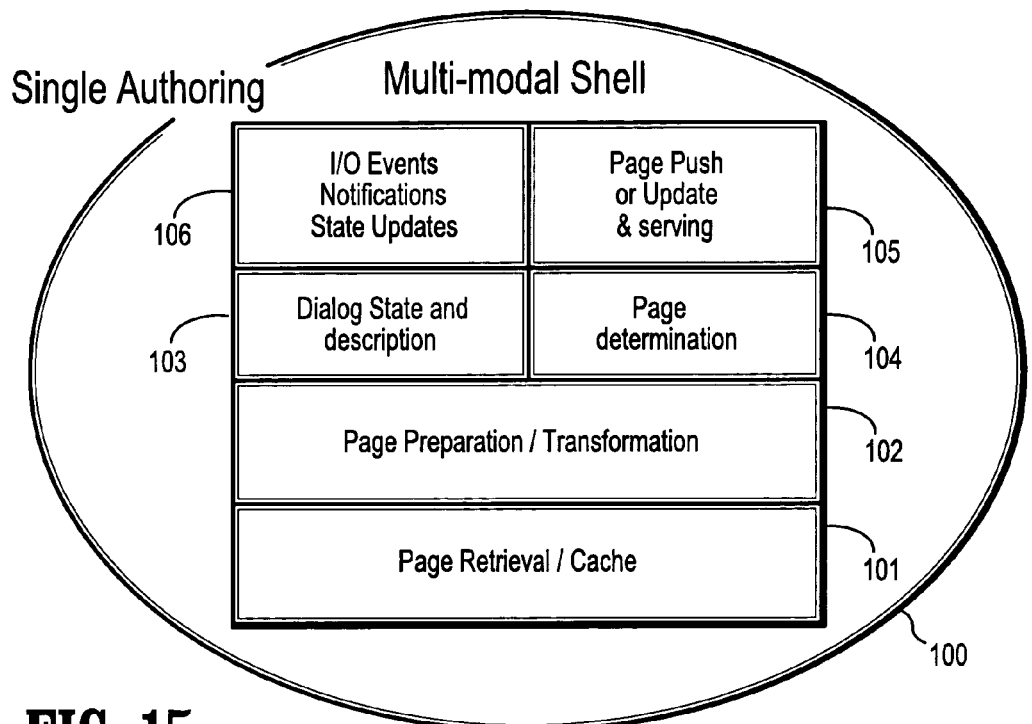
FIG. 15 is a diagram of illustrating a multi-modal shell framework according to an embodiment of the present invention.

FIG. 15 is a diagram of a multi-modal shell according to an embodiment of the present invention. The multi-modal shell 100 of FIG. 15 supports an application based on a single authoring modality-independent representation. The multi-modal shell 100 comprises a module 101 for retrieving and caching content pages (e.g., iML pages) and a module 102 for transforming the modality-independent representation of a content page into a modality-specific representation for each of the supported channel-specific browsers. The multi-modal shell 100 further comprises a module 103 for maintaining dialog state and a modality-independent description of the content page. Further, module 104 determine a next page, and module 105 manages page push operations and updates from the, e.g., DOM interfaces of the supported browsers. In addition, module 106 manages I/O and transport event notifications and determines the state updates to the application model as maintained in module 103 update all supported views based on a UI event in one view.

Figure 16:
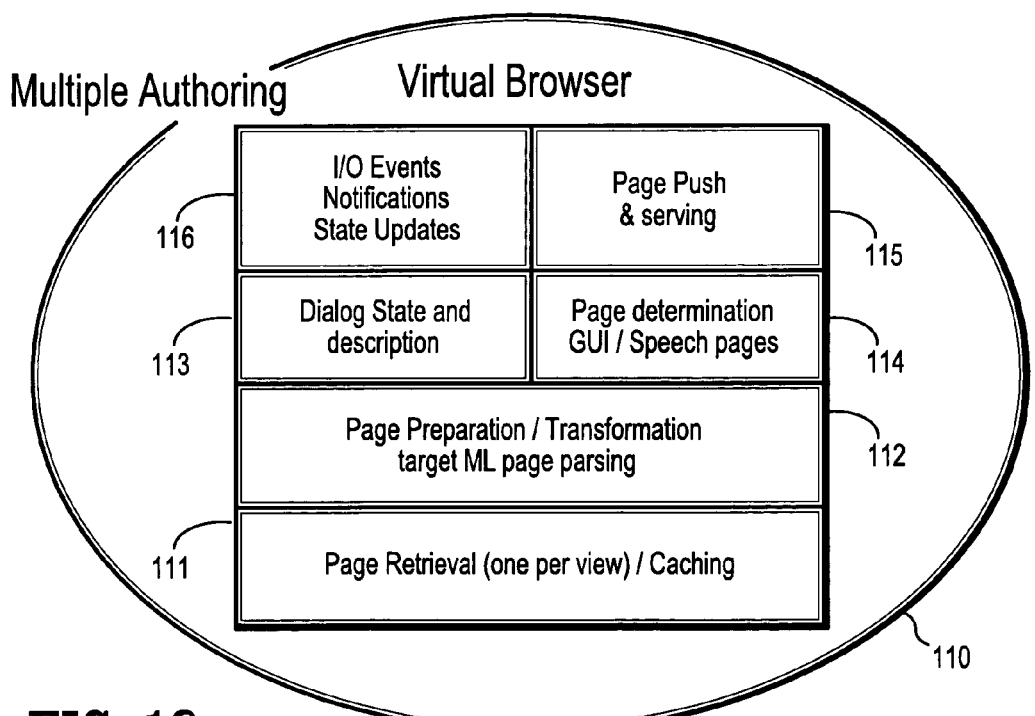
FIG. 16 is a diagram of illustrating a multi-modal shell framework according to an embodiment of the present invention.

FIG. 16 is a diagram of a multi-modal shell according to another embodiment of the invention, wherein the multi-modal shell supports an application that is based on a multiple authoring framework. The multi-modal shell 110 of FIG. 16 comprises a virtual browser that supports tight synchronization with multiple authoring using naming conventions or merged files. In one embodiment, the multi-modal shell 110 performs synchronization between the modalities primarily by relying on the naming conventions. Again, the main principle behind naming conventions lies in denoting specific markup elements by a unique name across all modalities. This allows to a developer to define well-named synchronization checkpoints, to thereby maintain the multi-modal browser system in a consistent state. The naming conventions approach can be extended to provide slot-level synchronization between WML and VoiceXML, due to the consistencies in the structures of the component content formats. For solving nontrivial synchronization issues, more advanced synchronization techniques are employed by embedding pieces of ECMAScript (or WMLScript) into the corresponding VoiceXML or WML markups, for example.

In another embodiment, the multi-modal shell 110 of FIG. 16 supports a multiple authoring framework based on merged files, wherein well-formatted channel specific snippets pages are shipped, one at a time, to each view. In this embodiment, the model repository acts as a server in between gestures. Submit result into polling all the views before submitting to the backend. Further, a mechanism is provided for automatically adding synchronization tags or naming conventions to provide synchronization between the views.

Figure 17:
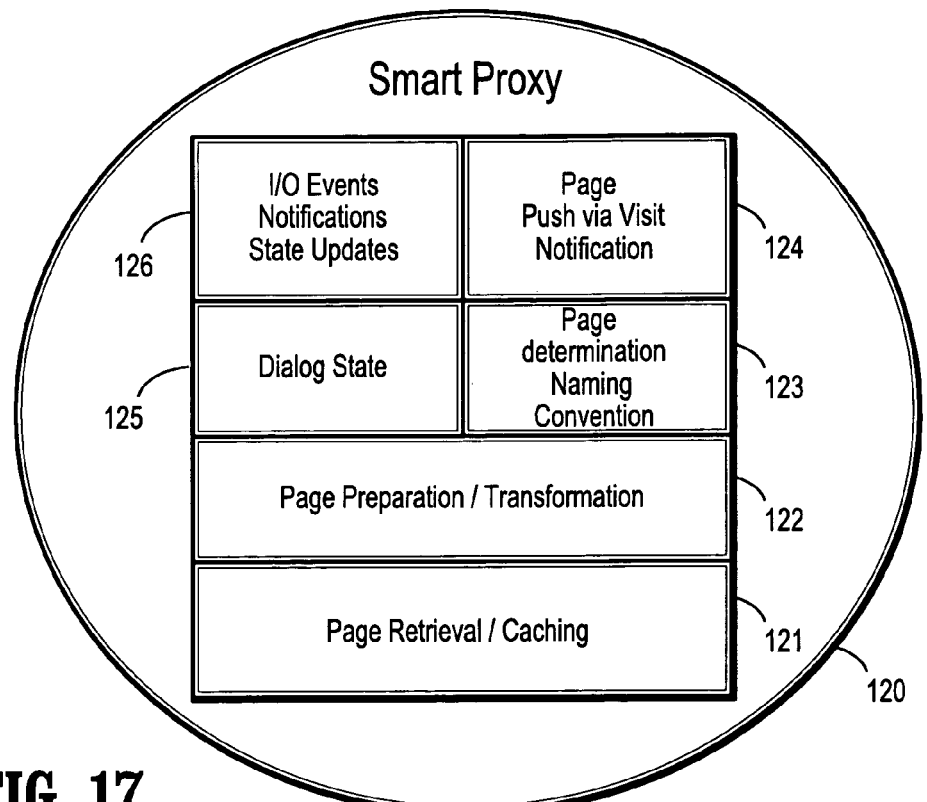
FIG. 17 is a diagram of illustrating a multi-modal shell framework according to an embodiment of the present invention.
Figure 18:
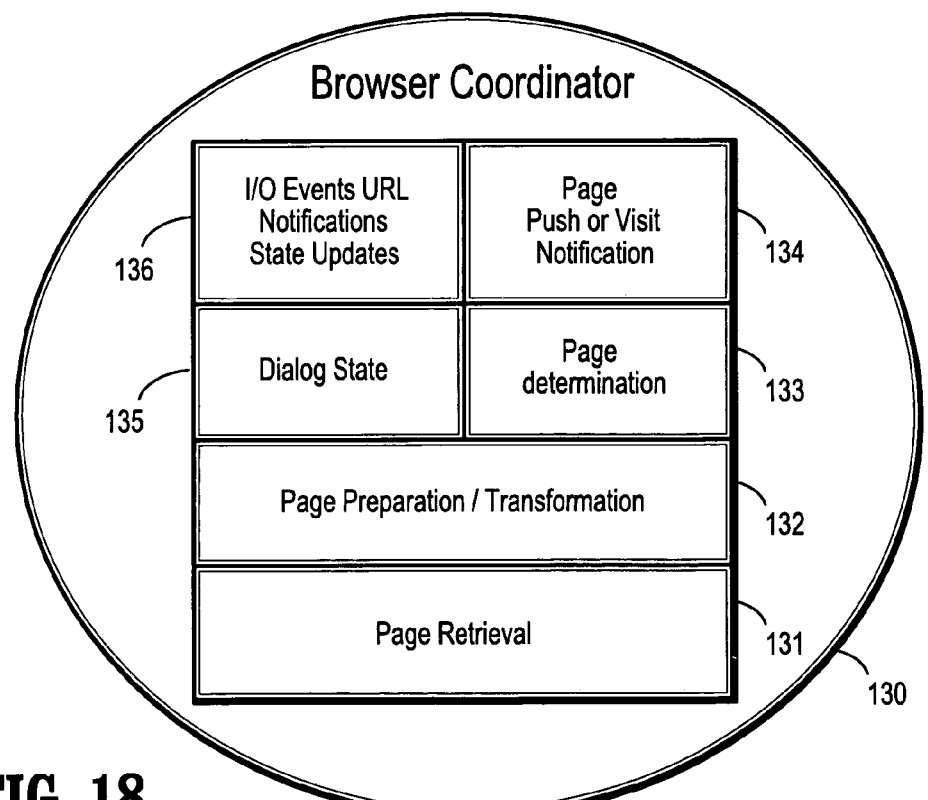
FIG. 18 is a diagram of illustrating a multi-modal shell framework according to an embodiment of the present invention.

FIGS. 17 and 18 are diagrams of multi-modal shells according to other embodiments of the present invention which support multiple authoring frameworks. FIG. 17 illustrates a multi-modal shell 120 comprising a smart proxy using naming conventions for synchronization. FIG. 18 illustrates a multi-modal shell according to another embodiment, wherein the shell acts as a browser coordinator that support a multiple authoring framework that uses synchronization tags.

Figure 28:
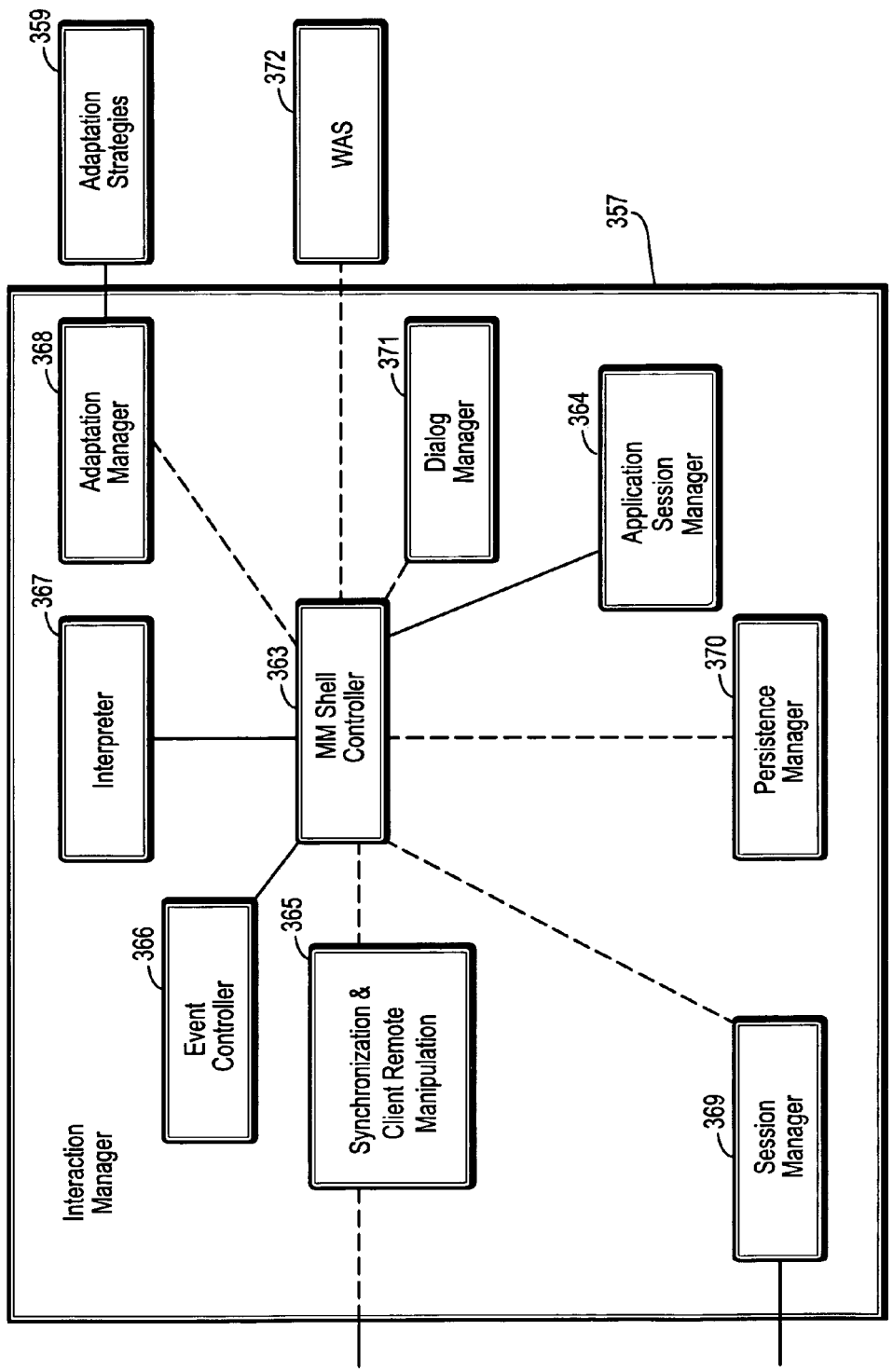
FIG. 28 is a diagram of a multi-modal shell according to an embodiment of the present invention.

FIG. 28 is a block diagram of an architecture of the interaction manager 357 according to an embodiment of the present invention. For server-side applications, the interaction manager 357 is preferably implemented as a servlet or Web intermediary plug-in. A multi-modal shell controller 363 controls the different components of the interaction manager 357 and comprises a hub for most of the functions.

An application session manager 364 maintains for each session and application the complete state and history of the application, including the data model instances, interaction instances as well as an application, user and focus history. A synchronisation and remote client manipulation module 365 enables exchange of events from the different registered channels and to update different channels. An event controller 366 is responsible for handling any incoming event. An interpreter 367 transforms an incoming description of the applications into classes and event handlers.

An adaptation manager 368 generates the presentation pages for each channel. When based on XSL transformation, the strategy can use a transcoding engine. As content adaptation strategies 359 are developed, they can be supported by implementing the interface to the content adaptation manager 368. With multiple authoring, interaction-based authoring and other methodologies can easily be integrated within the proposed framework. Adaptation relies on channel profile based on the delivery context provided by a session manager 369.

The session manager 369 identifies sessions, channel profile (delivery context) and users and further comprises functions of a user manager and device/channel manager. A persistence manager 370 saves session states for immediate or later access through a same or different delivery context. A dialog manager 371 manages dialog.

In FIG. 28, the dotted lines indicate that the components that are linked could be distributed. For example, the adaptation manager 368 and strategy 359 could be directly implemented on (Web Application Server) WAS 372 and the synchronization manager 365 and session manager 369 could be implemented on a Web Edge Server. Preferred configurations will depend on the functionality that is expected to be supported and the characteristics of the network.

VII. Synchronization Voice Transport and Conversational Remote Control Protocols The following section describes various protocols for (i) enabling synchronization of the views, (ii) transmitting speech data for server-side processing, and for (iii) remotely controlling conversational engines.

A. Synchronization Protocols

As noted above, synchronization protocols according to the present invention provide mechanisms for synchronizing the channel-specific (views) browsers of a MVC multi-modal browser. The synchronization protocols comprises mechanisms for exchanging synchronization information between the multi-modal shell and the channel-specific browsers. In one embodiment, synchronization information that is exchanged comprises (1) DOM filtered events such as DOM Level 2 UI events (and higher), XHTML generalized UI events, voiceXML events, etc. (2) HTTP (or other protocols) requests, such as URI requests; (3) DOM commands such as page push, output events, set events, get/set variables, DOM tree manipulation, etc. (4) blocking messages and (5) confirmation messages.

Further, to enable synchronization, events are systematically time stamped. This allows the different events to be ordered and enables disambiguation of ambiguous or contradictory events coming from different views. Preferably, clock synchronization protocol/exchange mechanisms are provided, such as the Network Time Protocol (NTP) adapted to the network capabilities (e.g. WAP), to provide time synchronization.

In one embodiment, the synchronization protocols are implemented using SOAP (Simple Ojbect Access Protocol).

As is known in the art, SOAP provides a mechanism for information exhchange using HTTP and XML to provide communication between systems in a network. In other embodiments, synchronization may be implemented using, for example, socket connections (event communication) and HTTP update messages.

In one embodiment of the present invention, the level of synchronization is static. In another embodiment, when dynamic settings are supported, a mechanism is employed to dynamically negotiate the level of synchronization granularity. This negotiation is preferably driven by the multi-modal shell (i.e. application developer), driven by the user's preferences, and/or driven by the network load.

A multi-modal browser accorcoding to the present invention that supports dynamically/spontaneously networked modalities comprises mechanisms to enable (i) discovery between different views and Multi-modal shell, (ii) registration of the views (ii). description of the view characteristics/capabilities (iv) spontaneous connection of new view; (v) disconnect and (vi) handshake to confirm active connection. Various discovery, registration and negotiation protocols that may be used to support spontaneuos networking are described, for example, in the above-incorporated U.S. Ser. No. 09/703,574.

B. Conversational Protocols

In one embodiment of the present invention, voice transport and conversational remote control protocols are implemented using the methods described in the above-incorporated U.S. Ser. No. 09/703,574, entitled "Conversational Networking Via Transport, Coding and Control Conversational Protocols." This application describes a novel real time streaming protocol (which is an extension of RTP (real time protocol)) that provides for real time exchange of, e.g., control information between distributed devices/applications. Conversational transport protocols are preferably employed to enable coding and transport (streamed or not) of the speech I/O in manner that is compatible with the various conversational engines. Conversational protocols enable audio and audio events to be exchanged as voice when the network supports voice and data, or to be exchanged as data (when voice is conversationally coded). Conversational protocols comprise transport and control of the presentation description as well as the synchronization information. Conversation protocols comprise distributed speech recognition protocols for remotely controlling conversational engines.

It is to be understood that any distributed speech approach may be implemented that allows speech compression and transport without introducing any degradation of the conversational engine performances. Indeed, Multi-modal interaction imposes similar real time constraints as human-to-human conversations. Therefore real-time conversational transport and control protocols are preferably implemented, which are similar to VoIP protocols. Preferably, when simultandouls voice and data channels are are used (e.g. GPRS), to transport voice to the conversational engines, assuming sufficient bandwidth is available.

In one embodiment of the present invention, the encoding mechanisms desribed in the above-incoorporated U.S. Ser. No. 09/703,574 are employed to build a distributed multi-modal browser. Briefly, conversational protocols for implementing distributed conversational networking comprise a suitable audio coding/decoding (Codec) protocol and file format protocol for packetization of the encoded speech data. A CODEC is preferably implemented for encoding/decoding speech/audio data that minimizes the distortion of acoustic front-end features and allows reconstruction of intelligible waveforms.

Preferred protocols for building a distributed multi-modal browser further comprise conversational streaming and control protocols (as described in the above-incorporated U.S. Ser. No. 09/703,574) that provide real-time transmission and control of the encoded data and other control data to, e.g., control the conversational engines. More specifcally, in one embodiment, the encoded data packets are wrapped in RTP (Real Time Protocol) streams to generate what is referred to as RTCCP (Real time conversational coding protocol). Furthermore, the RTCP (real time conntrol protocol) is extended to provide RTCCtP (Real-time Conversational control Protocol) for controlling the CODEC. The RTCP is further extended to provide RTCDP (Real time Conversational Distributed Protocol) for implementing and controlling distributed functions such as engine control.

RTCDP enables real-time exchange of control parameters such as argument data file(s) for the server engines, additional feature transformations, addresses where to send the results (back to browser or to content server), format of result (text, XML or Audio RTP stream), extra tag information and addresses of browsers or servers where to push data, identifier for the results, commands to execute, data files: what data files to use and which location to obtain such files, description of the type of processing to apply, e.g. algorithm string—sequence of actions to perform on the input; expected type and format of the results, address where to return the results; exception handling mechanisms I/O event notifications for a distributed DOM multi-modal browser; modality specific view updates (e.g. ML pushes to the modality specific viewing browsers in the multi-modal browser case), etc.

Figure 19:
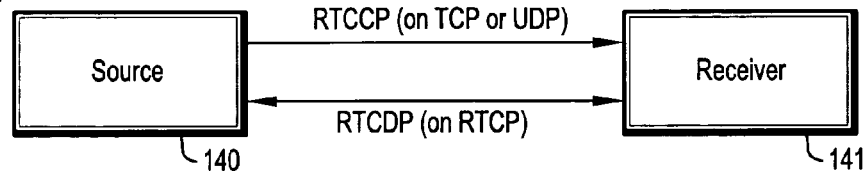
FIG. 19 is a diagram illustrating communication protocols that may be implemented with a multi-modal browser according to the present invention for coding, transport and control of audio data and control data.

FIG. 19 is a high level diagram illustrating methods for implementing conversational transport and control protocols (as more fully described in U.S. Ser. No. 09/703,574), which are preferably employed for multi-modal browsers according to the present invention. Briefly, mechanisms for transmitting voice data and exchanging information between a source 140 and receiver 141 in a multi-modal browser architecture comprise RTCCP implemented on top of UDP (for real-time applications) or TCP (for non real-time applications) with the control messages of the RTCDP implemented in a header extension of the RTCP. These protocols are sufficient for real-time low bit rate transmission over wireless modem and real-time interaction. In the embodiment of FIG. 19, the source 140 comprises the audio source and audio controller.

Advantageously, the use of RTP-based conversational protocols as described herein guarantees that the conversational protocols are compatible with, and can be extended to, any network (existing or future) that supports streamed data and Voice over IP or packet voice communications. For example, well-known protocols such as H.323 and SIP (session initiation protocol), which rely on RTP/RTCP can be readily extended to implement the conversational protocols described herein. Moreover, other types of wireless networks can use similar designs adapted to the peculiarity of the underlying communication protocol layers.

Further, as indicated above, it is to be understood that the above-described functions could be directly supported on top of TCP, HTTP or other transport protocols, depending on the importance of real-time versus guaranteed packet delivery, using the same conversational protocols and header extensions.

Figure 20:
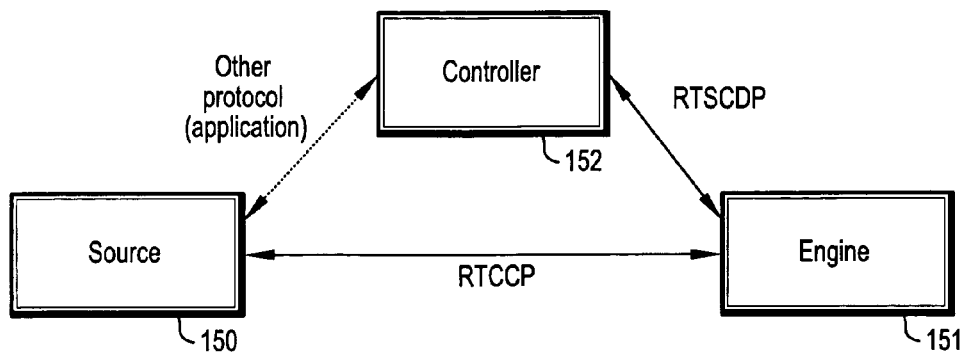
FIG. 20 is a diagram illustrating communication protocols that may be implemented with a multi-modal browser according to the present invention for coding, transport and control of audio data and control data.

FIG. 20 is a diagram illustrating other conversational protocols that may be employed for building a distributed multi-modal browser according to the present invention. FIG. 20 illustrates a system/method for implementing RTSP (real time streaming protocol) using conversational protocols, wherein RTCDP messages are preferably wrapped in RTSP (real time streaming protocol) instead of RTCP, to produce what is referred to as RTSCDP (real time streaming conversational distributed protocol). This streaming mechanism is preferable when remote control of conversational engines 151 is performed by a controller 152 that is separate from the source(s) 150 of the audio RTCCP stream.

More specifically, in FIG. 20, a source 150, controller 152 (e.g., speech browser) and engine server 151 are remotely connected over a network. The source 150 and server 151 communicate via RTCCP/RTCCtP. The source 150 and controller 152 communicate via any suitable application protocol. The controller 152 and server 151 communicate via RTSCDP. The RTSCDP protocol is used when control of the conversational engines 151 is performed by the controller 152 and not the source 150. In such a case, it is preferable to ship the audio from the source 150 directly to the engine server 151 engines, instead of shipping audio from the source 150 to the controller 152 (browser) and then having the controller 152 ship the audio and control data to the server engines 11.

In a Voice over IP environment, for example, the RTSP protocol has been explicitly developed to act as a remote control of an appliance/service (i.e., controller 152) acting on a RTP stream with appropriate synchronization features with the RTP stream when needed. Therefore, given the current VoIP framework, it is advantageous to extend RTSP to add the conversational control messages (transmitted between the controller 152 and server 151) on top of RTSP to control the conversational engines 151 which process the encoded voice data in a RTCCP/RTCCtP stream generated by the source 150.

Figure 21:
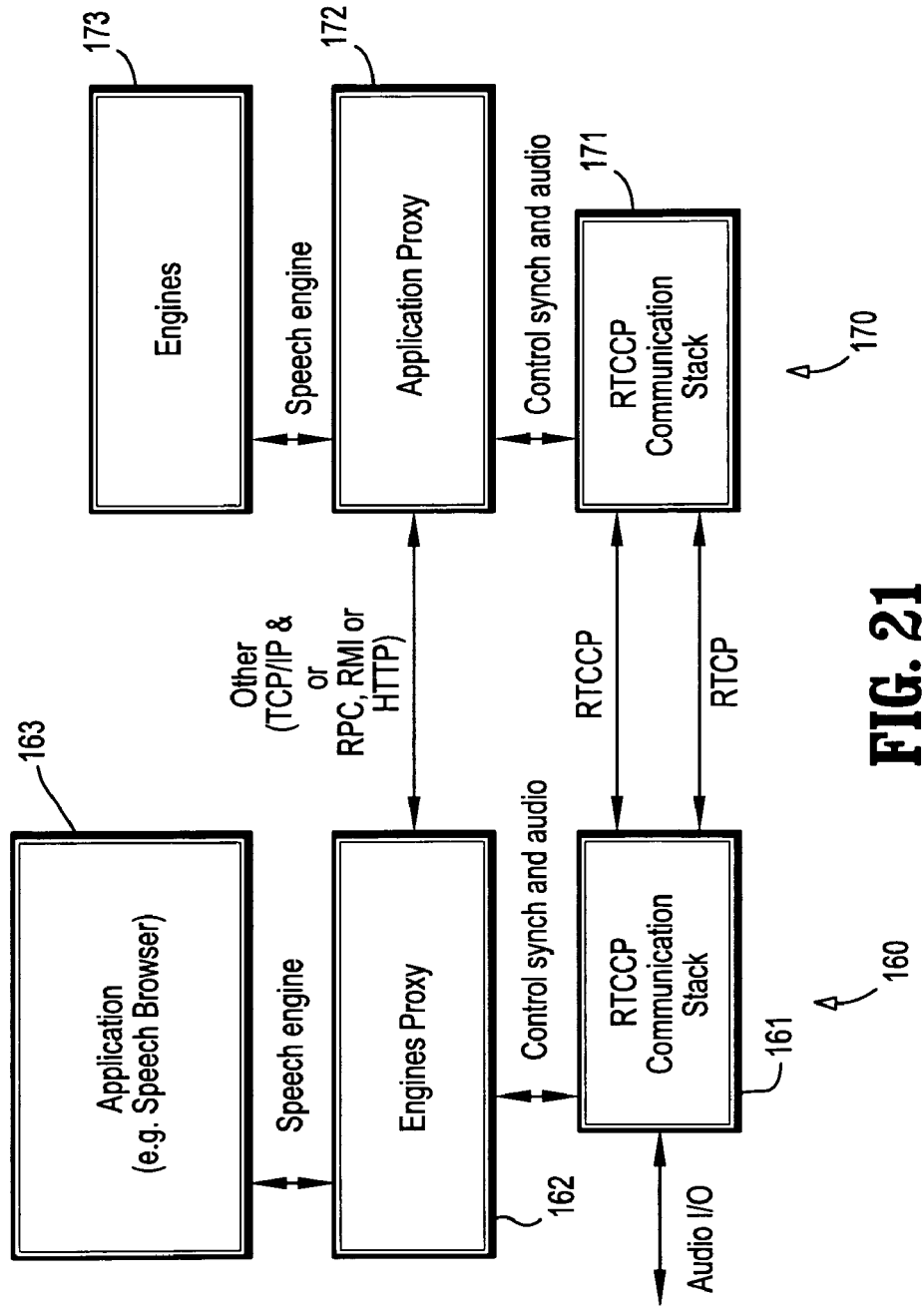
FIG. 21 is a diagram of a system and method for providing remote control of distributed speech engines which may be implemented with a multi-modal browser according to the present invention.

FIG. 21 is a diagram that illustrates a system/method for implementing a distributed multi-modal browser framework using proxy servers. The system comprises a client 160 and a server 170, each comprising an RTCCP/RTCCtP communication stack 11, 171 for implementing RTCCP for conversational transport and control of encoded speech data. The client 160 comprises an engine proxy 162 and an application 163 such as a speech browser. The server 170 comprises an application proxy 172 and conversational engines 173.

The engine proxy 162 operates on behalf of a browser application 163, and the browser proxy 172 operates on behalf of conversational engines 173. More specifically, the proxies 162, 172 exchange control data to enable the engine proxy 162 to effectively operate as a local speech engine for the browser 162, and to enable the browser proxy 172 to effectively operate as a local browser for the engines 173. The engines 173 will directly communicate with the browser proxy 172 using suitable speech engine APIs and the browser 163 will communicate with the engine proxy 162 using the same engine APIs. Advantageously, this framework allows the engines 173 and browser application 163 to disregard the fact that the other component is local, remote, or distributed.

In the embodiment of FIG. 21, the proxies 162, 172 utilize conventional protocols such as TCP/IP and sockets or RMI, RPC or HTTP, for example, for control and exchange of the conversational application API/messages/control data, and the RTCCP and RTCCtP protocols are used for real-time exchange of the audio via the communication stacks 161, 171.

In alternate embodiments, RTCDP control of, e.g., remote conversational engines can be implemented via remote APIs (e.g., RMI (preferably JSAPI (java speech API with extensions) or RPC) to the engines which precedes argument audio streams, although higher level control is still preferably performed via RTCCtP. The remote calls preferably use TCP (over IP) or any other transport mechanism that reliably guarantees message delivery.

Accordingly, audio is exchanged via RTP encoded according to particular encoding scheme. This coding scheme may be DSR optimized codec (e.g. ReCoVC) or not. It is transmitted on the network transport layers. In addition, codec description, negotiation, dynamic switches and setup can be exchanged via SDP (Session Description protocol) over SIP or SOAP over SIP. For a client unable to perform XML parsing or to run a SOAP engine, it will be possible to run a statically defined version of SOAP. Additional speech meta-information is exchanged over SOAP or over RTP (interleaved with the RTP package). In addition, multi-modal synchronization can be implemented via SOAP or remote DOM and engine remote control can be implemented via WSDL over SOAP.

VIII. Multi-Modal Browser Implementations

An MVC-based multi-modal browser may be implemented using currently existing architectures and protocols as described herein. For instance, voice can be transported as voice over any currently available networks that support voice and data. In other networks that support data only, the conversational protocols described above can be used to transport encoded voice data.

Furthermore, as explained above, conventional browsers (e.g., HTML, VoiceXML) can be readily extended to provide a DOM L2 interface or a similar interface. Again, such extensions can be relatively modest, depending on the desired synchronization granularity. Currently, DOM specifications exist to some extent for HTML and XML. It is to be appreciated that based on such specifications and based on the teachings herein, components for implementing a WML DOM can be readily envisioned by those skilled in the art. Indeed, XML DOM specifications can be directly used to specify WML DOM, interface and events. Further, based on the XML specifications and on the teachings herein, components for implementing a VoiceXML DOM can be readily envisioned by those skilled in the art. In the near future, in is anticipated that standards for WML DOM and VoiceXML DOM specifications will be proposed to and/or accepted by the W3C or VoiceXML Forum.

A. VoiceXML DOM

The following is an outline of preferred specifications for implementing a VoiceXML DOM according to the present invention. A Level 1 VoiceXML DOM can be implemented as using a conventional XML DOM specification with specialized nodes for each part of VoiceXML (this is analogous to HTML).

For Level 2 DOM, a VoiceXML DOM specification according to one aspect of the present invention comprises a Range Module for defining the Range feature, a Traversal Model for defining the Traversal and Events module for defining feature events. For TTS (text-to-speech) synthesis, a DOM preferably supports JSML (java speech markup language, emphasis, etc.). Events associated with TTS include, for example, TTS start, TTS stop, Word Start, Word Stop, Marker reached, etc. For speech recognition, the associated data files preferably comprises DOM nodes. Further, events for speech recognition include, for example, add and remove grammars, check active grammars, recognition event, recognized text, etc.

Other events, such as events associated with Focus, preferably comprises: get active node; set focus (where the Browser would skip nodes to a specified node and activate it), focus off, activate (new node active after filling a prompt (speech reco)), etc. Other events comprise State events comprising, for example, set variable, get variable, etc.

For IVR (interactive voice response) functionality, a Transfer function is used for setting focus on a Transfer root node and a Disconnect function is used for setting focus on disconnect root node. For DTMF (dual tone multifrequency) functionality, events include, for example, set/remove DTMF grammar, Get grammars, recognition event, recognized DTMF input, etc. Other functions include, for example, service functions for setting focus on service root node.

A Level 3 VoiceXML DOM preferably comprises Page loading (which can be done at L1)

In one embodiment, The VXML event module comprises events listed in VXML 1.0 and additional events of general VXML 1.0 browser. A DOM application may use the hasFeature(feature, version) method of the VXMLDOMImplementation interface with parameter values "VXMLEvents" and "1.0" (respectively) to determine whether or not the VXML event module is supported by the implementation. To fully support this module, an implementation should support the "Events" feature defined below. Reference can be made to additional information about conformance in the DOM Level 2 Core specification.

Interface VXMLEvent: The VXMLEvent interface provides specific contextual information associated with VXML events.

```
IDL Definition
  interface VXMLEvent : Event {
    readonly attribute DOMString    detail;
    void    initVXMLEvent(in DOMString typeArg,
                in boolean canBubbleArg,
                in boolean cancelableArg,
                in DOMString detailArg);
  };
```

Figure 22:
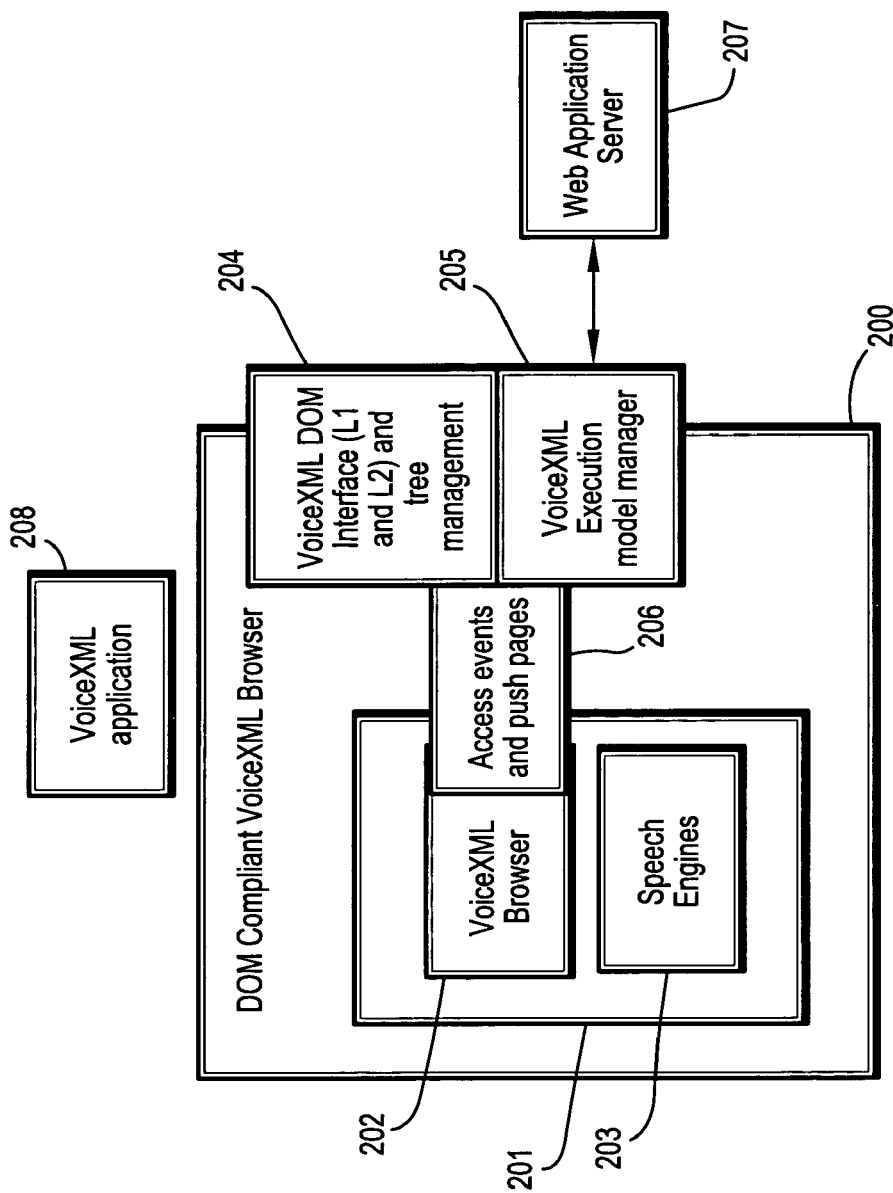
FIG. 22 is a diagram of a system and method for DOM implementation of a VoiceXML browser according to an embodiment of the present invention.

Attributes: detail—Specifies some detail information about the VXMLEvent, depending on the type of event.
Methods
InitVXMLEvent: The initVXMLEvent method is used to initialize the value of a VXMLEvent created through the DocumentEvent interface. This method may only be called before the VXMLEvent has been dispatched via the dispatchEvent method, though it may be called multiple times during that phase if necessary. If called multiple times, the final invocation takes precedence.
Parameters
TypeArg of type DOMString
Specifies the event type.
canBubbleArg
of type DOMString
Specifies whether or not the event can bubble.
cancelableArg
of type DOMString
Specifies whether or not the event's default action can be prevented.
detailArg
of type DOMString
Specifies the VXMLEvent's detail.
No Return Value
No Exceptions
Note: To create an instance of the VXMLEvent interface for the VXML event module, use the feature string "VXMLEvents" as the value of the input parameter used with the createEvent method of the DocumentEvent interface.
The VXML events use the base DOM Event interface to pass contextual information.
The different types of such events that can occur comprise:
synthesizerResumed: The synthesizerResumed event occurs when the audio output is resumed.
  Bubbles: Yes
  Cancelable: No
  Context Info: None
synthesizerPaused: The synthesizerPaused occurs when the audio output is paused.
  Bubbles: Yes
  Cancelable: No
  Context Info: None
synthesizerWordStarted:The synthesizerWordStarted event occurs when the synthesizer begins to output a word.
  Bubbles: Yes
  Cancelable: No
  Context Info: word
synthesizerWordStopped: The synthesizerWordStopped event occurs when the synthesizer finishes a word output.
  Bubbles: Yes
  Cancelable: No
  Context Info: word
synthesizerMarkerReached: The synthesizerMarkerReached event occurs when a JSM: marker is encountered.
  Bubbles: Yes
  Cancelable: No
  Context Info: marker property
recognizerResultUpdated: The recognizerResultUpdated event occurs when the recognizer gets a token.
  Bubbles: No
  Cancelable: No
  Context Info: result
recognizerResultAccepted: The recognizerResultAccepted event occurs when speech input is accepted.
  Bubbles: No
  Cancelable: No
  Context Info: result
recognizerResultRejected: The recognizerResultRejected event occurs when speech input is rejected.
  Bubbles: No
  Cancelable: No
  Context Info: result
DOMFocusIn: The DOMFocusIn event occurs when an element receives focus.
  Bubbles: Yes
  Cancelable: No
  Context Info: None
DOMFocusOut: The DOMFocusOut event occurs when an element loses focus.
  Bubbles: Yes
  Cancelable: No
  Context Info: None DOMActivate: The DOMActive event occurs when the value of a element is changed.
Bubbles: Yes
Cancelable: No
Context Info: None dtmfInput: The dtmfInput event occurs when the key input occurs.
Bubbles: Yes
Cancelable: No
Context Info: dtmf digit cancel: The cancel event occurs when the user has requested to cancel playing of the current prompt.
Bubbles: Yes
Cancelable: No
Context Info: None telephoneDisconnectHangup: The telephoneDisconnectHangup event occurs when the user has hung up.
Bubbles: Yes
Cancelable: No
Context Info: None telephoneDisconnectTransfer: The telephoneDisconnectTransfer event occurs when the user has been transferred unconditionally to another line and will not return.
Bubbles: Yes
Cancelable: No
Context Info: None exit: The exit event occurs when the user has asked to exit.
Bubbles: Yes
Cancelable: No
Context Info: None help: The help event occurs when the user has asked for help.
Bubbles: Yes
Cancelable: No
Context Info: None noinput: The noinput event occurs when the user has not responded within the timeout interval.
Bubbles: Yes
Cancelable: No
Context Info: None nomatch: The nomatch event occurs when the user input something, but it was not recognized.
Bubbles: Yes
Cancelable: No
Context Info: None errorBadfetch: The errorBadfetch event occurs when a fetch of a document has failed and the interpreter context has reached a place in the document interpretation where the fetch result is required.
Bubbles: Yes
Cancelable: No
Context Info: None errorSemantic: The errorSemantic event occurs when a run-time error was found in the VoiceXML document.
Bubbles: Yes
Cancelable: No
Context Info: None errorNoauthorization: The errorNoauthorization event occurs when the user is not authorized to perform the operation requested.
Bubbles: Yes
Cancelable: No
Context Info: None errorUnsupportedFormat: The errorUnsupportedFormat event occurs when the requested resource has a format that is not supported by the platform.
Bubbles: Yes
Cancelable: No
Context Info: None errorUnsupportedElement: The errorUnsupportedElement event occurs when the platform does not support the given element.
Bubbles: Yes
Cancelable: No
Context Info: None It is to be understood that the VoiceXML DOM specifications/events outlined above illustrate one embodiment. Other frameworks using a subset of the above specification or other organizations of the functions are readily envisioned by those skilled in the art based on the teachings herein. A VoiceXML DOM specification can be readily implemented as long such framework follows the principles behind DOM L2, the above specifications, and the known XHTML generalized events., FIG. 22 is a diagram of a DOM VoiceXML browser according to an embodiment of the present invention. Preferably, a DOM VoiceXML browser 200 comprises a DOM implementation of a currently existing VoiceXML browser 201 with some adaptations as discussed above. The VoiceXML browser 201 comprises a component browser 202 and speech engines 203, which are used for interpreting and rendering content according to the VoiceXML standard. A conventional VoiceXML browser 201 can be extended to a DOM compliant VoiceXML browser 200 by modifying the existing browser to (i) provide access to the events (such as defined above) and to (ii) push VoiceXML pages set/get variables. A method 206 for accessing events and pushing pages is provided by a VoiceXML DOM interface (preferably L1 and L2) and tree management module 204 and Voice XML execution model manager 205. The execution model manager 206 generates and pushes VoiceXML snippets to the browser 202: one prompt, allogmerated active grammars.

Advantageously, the use of snippets of VoiceXML sent to the existing VoiceXML browser is a way to modify and externally control the browser 202 despite the execution model imposed by VoiceXML 1.0. The underlying principle is similar to the use of snippets with multiple authoring using merged files. At each stage, the VoiceXML DOM execution model manager 205 parses a VoiceXML page 208 received from a web application server 207 and then builds the corresponding DOM tree which is managed by module 204. Because of the sequential/loop execution model of VoiceXML, at each stage, it is possible to emulate the next step as a prompt+an input/menu with a grammar dynamically compiled as the result of all the grammars currently active (i.e. within scope). As a result, if the manager 205 emulates the execution model of VoiceXML (as long as that no external DOM call has been made), the manager 205 can produce a fully formed VoiceXML snippet page that comprises such information, which will result into a return to the manager as soon that an input or event has been provided. Events can be captured and transmitted as DOM events to the outside of the browser. External DOM calls result into changing the DOM tree, creating a new active snippet and pushing it to the conventional VoiceXML browser 201.

B. Push-Less Implementations

Figure 23:
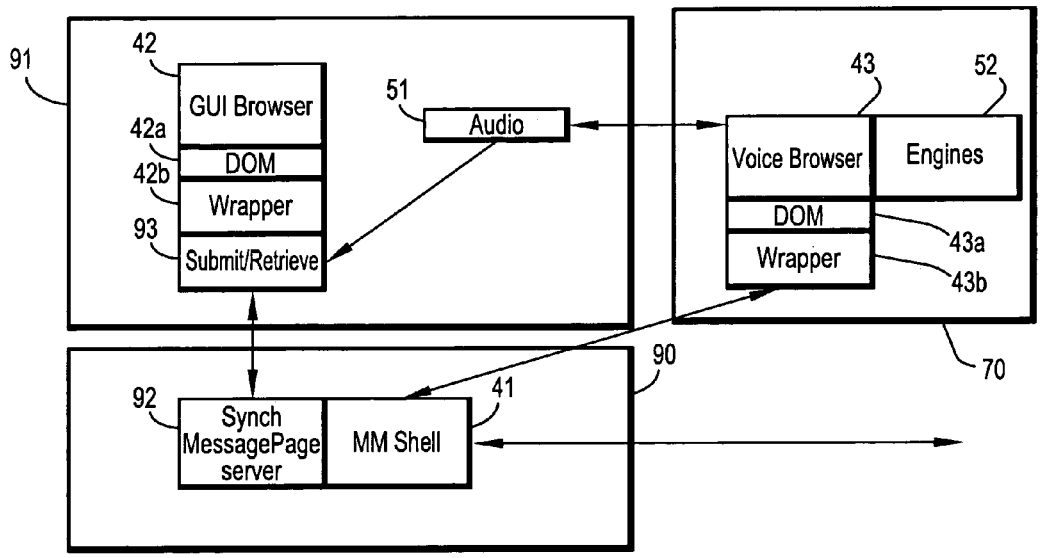
FIG. 23 is a diagram of a distributed WAP multi-modal browser framework according to an embodiment of the present invention.

FIG. 23 is a diagram of a push-less multi-modal browser according to an embodiment of the present invention. In particular, FIG. 23 is a diagram of a push less implementation of a DOM multi-modal WAP browser framework shown in FIG. 9. Currently, push is not yet widely available on WAP networks (push is supported by WAP 1.2). In FIG. 23, a push-less Multi-modal WAP browser is provided where the DOM wrapper 42*b* pulls synchronization messages and event messages. Instead of exchanging events (and transport) messages from the views to the controller and synchronization messages from the controller to the views, the following protocol is preferably implemented. Events are transmitted by the GUI wrapper 42*b* to the MM shell 41 as parameters of a submit 93, wherein the queries are transported using mechanism similar to e.g., a HTTP URL CGI query or the corresponding WAP query. Synchronization messages 92 to update or push are returned from the MM shell 41 to the wrapper 42*b* as results of these queries. The wrapper 42*b* then parses the message and executes the corresponding update of the view (GUI) or makes the browser 42 get a new page from the controller. The latter case can be performed by commanding the browser to load the page, for example through the DOM interface 42*a* or by having the wrapper 42*b* perform an additional submit 93 to the multi-modal shell 41 to obtain a new page from the shell 41 and loading it in the browser 42 (e.g. via a DOM instruction).

Furthermore, in the framework of FIG. 23, notifications of events from the voice browser 43 are preferably obtained as follows. When the audio subsystem 51 detects voice activity and sends speech to the voice browser 42, the audio subsystem 51 will query the MM shell 41 once (with a delay or with a submit that waits for an answer) for the new instruction. The method of pushing messages to the VoiceXML browser 43 is typically not an issue as the network between the voice browser 43 and the multi-modal shell 41 supports HTTP and TCP/IP and, therefore, supports push or socket connections.

Figure 24:
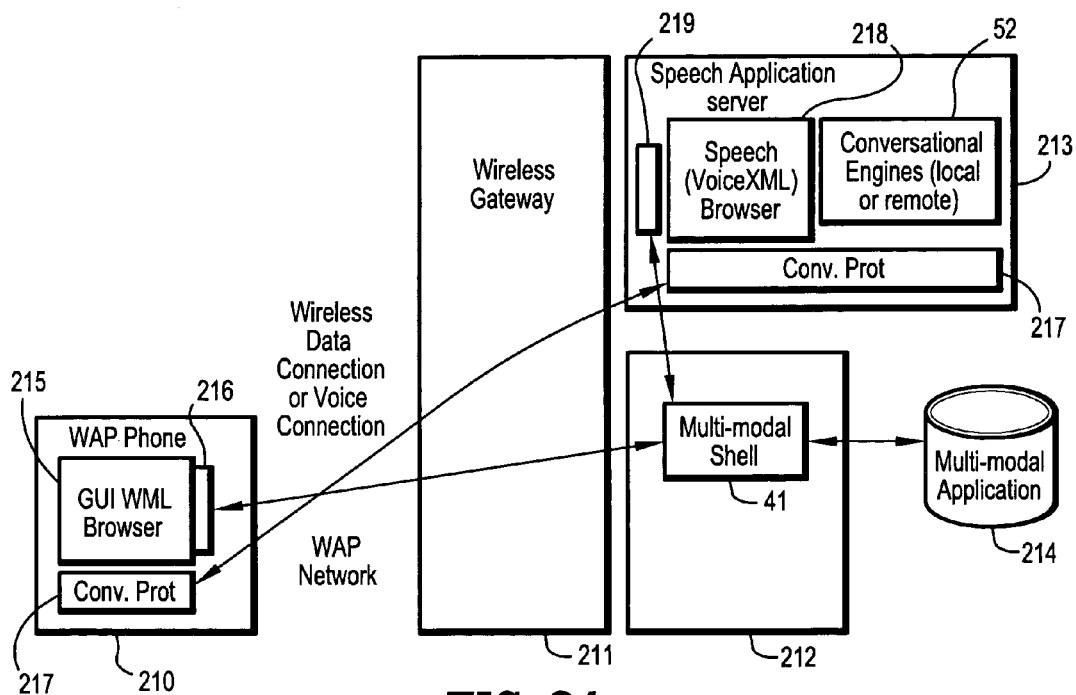
FIG. 24 is a diagram of a distributed WAP multi-modal browser framework according to an embodiment of the present invention.

FIG. 24 is a diagram of distributed multi-modal MVC WAP browser according to an embodiment of the present invention. The distributed framework comprises a WAP enabled client 210 (e.g., WAP phone). The WAP client 210 comprises a WML browser 215 and associated DOM interface 216 and a communication stack 217 which implements suitable communication protocols such as those described herein. The WAP phone 210 communicates with various devices (e.g., a speech application server 213, and server 212) over a WAP network and through a wireless gateway 211. The speech application server 213 comprises a speech browser 218 and associated. DOM interface 219, conversational engines 52 and a communication stack 217. Preferably, the distributed WAP system of FIG. 24 provides push support by WAP (WAP 1.2), comprises a WML DOM specification and a WML browser with a DOM L2 interface, and provides support of Voice over Data (GPRS) or conversational coding and protocols as described above (for data only connections).

Figure 25:
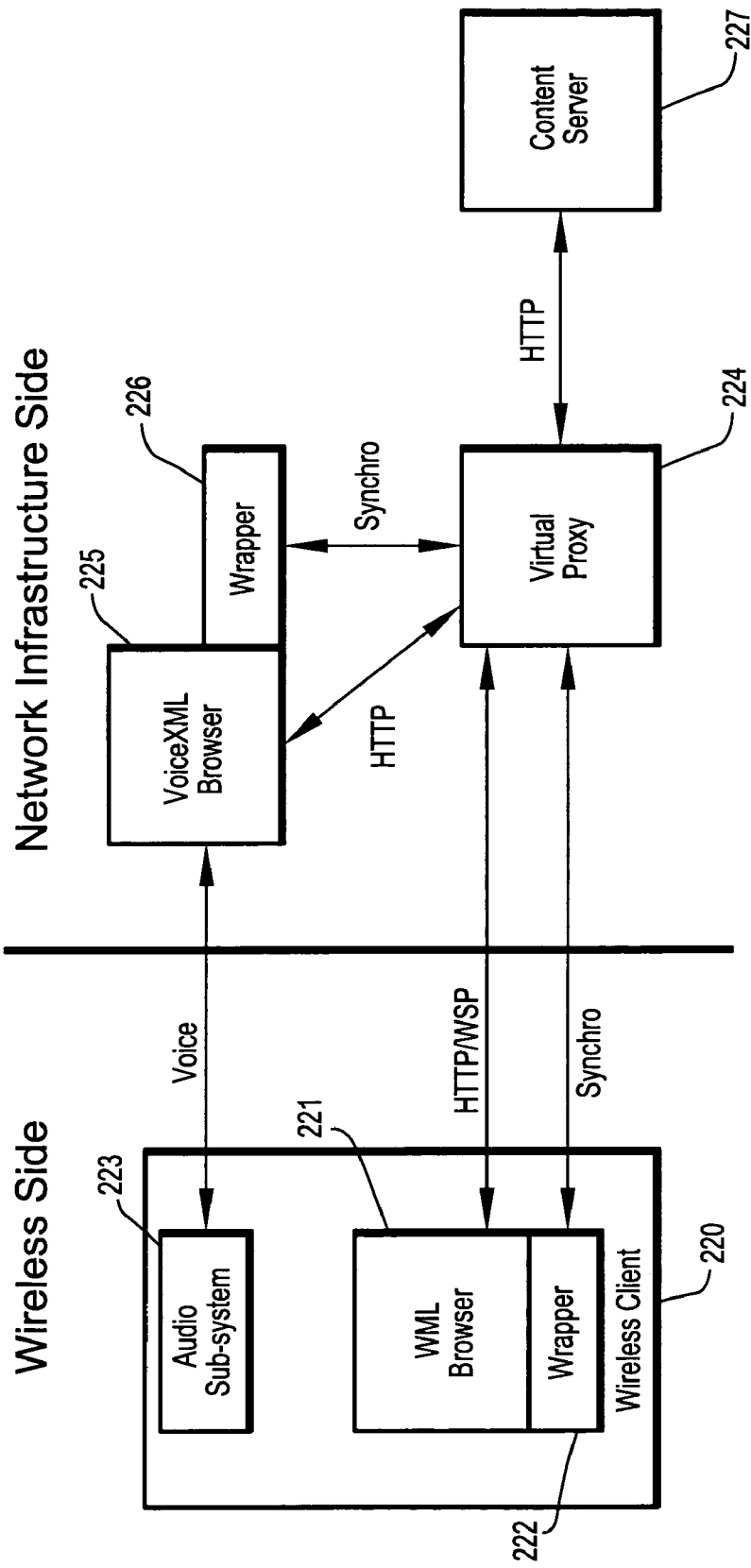
FIG. 25 is a diagram of a distributed WAP multi-modal browser framework according to an embodiment of the present invention.

FIG. 25 is a diagram of a distributed WAP MVC Multi-modal browser according to another embodiment of the present invention. The architecture of FIG. 25 employs the multi-modal browser synchronisation technique known as "loosely coupled synchronisation". A wireless client device (e.g., WAP-enabled phone) 220 comprises a WML browser 221 (for interpreting and rendering content according to the WML standard) an associated wrapper 222 to implement synchronization protocols and an audio subsystem 223 for capturing and processing voice data. The network backbone comprises a VoiceXML Browser 225 (for interpreting and rendering content according to the VoiceXML standard) and associated wrapper 226 for implementing synchronization protocols, a virtual Proxy Module 224 for maintaining the synchronization between the component browsers 221, 225, and for placing requests to a content server 227 to request content updates from the content server 227. The virtual proxy 224 in this embodiment does not maintain the state of the application. The virtual proxy 224 only performs synchronization of the different views as a web intermediary or proxy. The Content server hosts the content to be browsed, and responds to requests for specified content. Again, the wrappers 222, 226 augment the corresponding browsers 221, 225, to implement the synchronization protocols. The distributed framework uses synchronization protocols ("synchro") to communicate UI events that result into changes in the browser state from one component browser 221 to the other component browser 225. The synchronization protocols preferably support exchange similar to UI DOM events and DOM control messages. The component browsers 221, 225 preferably accept standard content formats according to the VoiceXML 1.0 and the WML 1.2 specifications.

Figure 26:
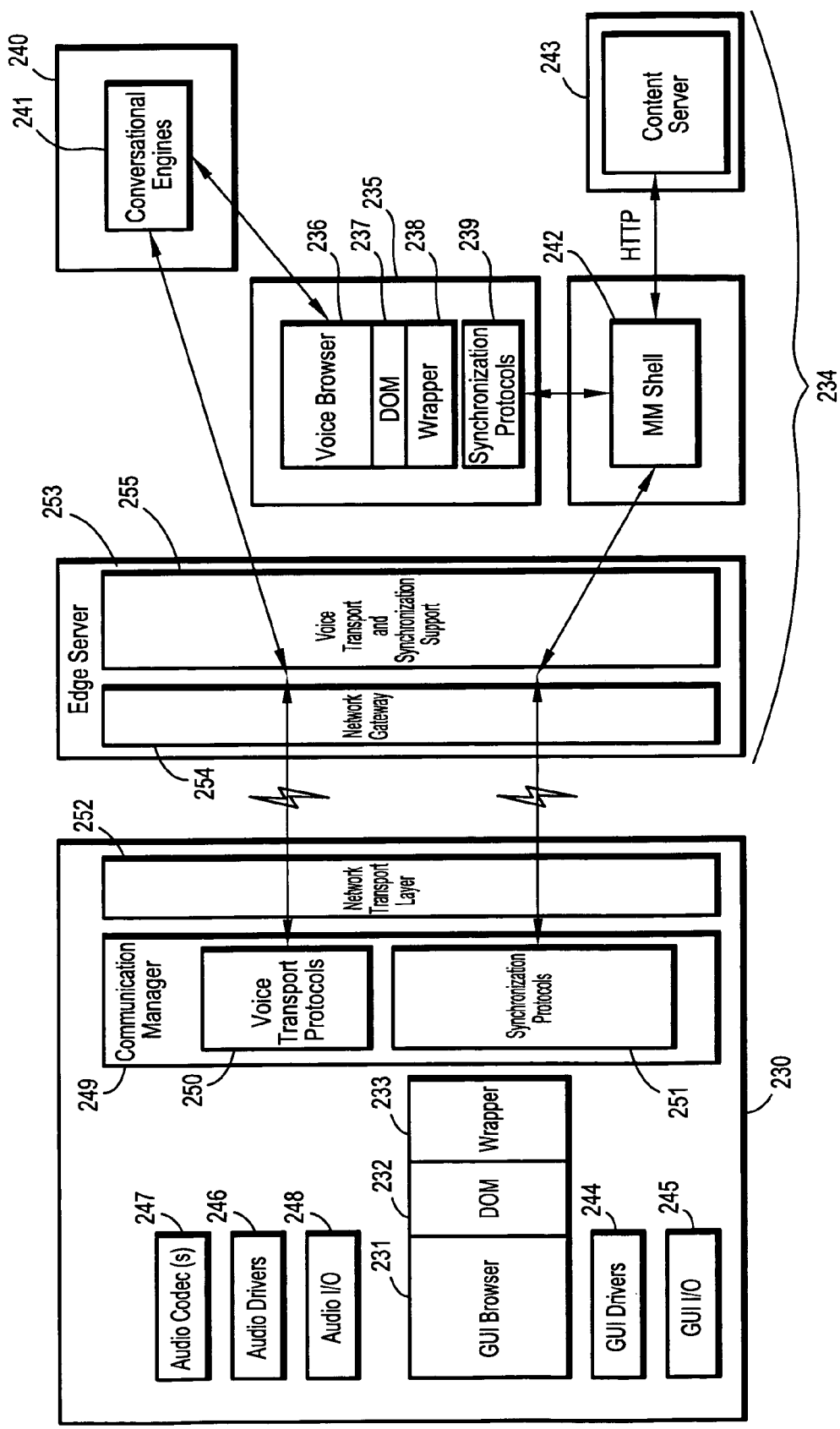
FIG. 26 is a diagram of a multi-modal browser framework according to an embodiment of the present invention.

FIG. 26 is a diagram of a distributed MVC multi-modal browser architecture according to another embodiment of the present invention. In this embodiment, a client device 230 comprises a GUI browser 231 and associated DOM and wrapper layers 232, 233, wherein server-side processing 234 comprises a server 235 comprising a Voice browser 236 and associated DOM and wrapper layers 237, 238. Server-side components further comprise an engine server 240 that supports a plurality of conversational engines 241 (speech reco, etc.), a multi-modal shell server 242 and content server 243.

The logical software modules on the client device 230, such as GUI I/O drivers 244 and I/O peripherals 245, are not modified to implement the multi-modal browser—they are controlled through a conventional GUI browser 231. Similarly, components of an audio system comprising audio drivers 246, audio codecs 247 and audio peripherals 248 are accessed by the GUI browser through the audio subsystem The browser wrappers 233, 238 are built around the DOM interface (or DOM-like interfaces) to provide reuse of existing (DOM compliant) browsers or minimize the changes to the GUI browser. In the embodiment of FIG. 26, the wrappers 233, 238 do not implement the support of the synchronization protocols. On the client side, a communication manager 249 supports synchronization protocols 251 for processing event information. On the server side, a synchronization manager 239 employs synchronization protocols for processing UI event information.

The communication manager 249 on the client side captures the communication functions provided by a UI manager. The communication manager further supports voice coding and transport protocols 250 for transport and control of encoded voice data to the conversational engines 241 for server-side processing. Whenever a voice channel is available simultaneously to a data channel (voice and data—e.g. GPRS), and enough bandwidth is available, it can be used to transport voice to the conversational engines using, for example, the conversational protocols described above in Section VII. Again, the conversational protocols preferably employ coding schemes that guarantee that speech compression and transport does not introduce any degradation of the conversational engine performances.

The communication manager 249 further provides support of synchronization protocols, which protocols are used for synchronizing the browser as described above. The page push and pull functions can be implemented using HTTP or WSP, for example. Further, the synchronization protocols 251 may further comprise protocols to remotely control the engines 241. Protocols to remotely control conversational engines can be part of the synchronization protocols or a stand-alone protocol. The latter case occurs when the conversational remote control protocols do not involve the client. For example in the embodiment of FIG. 26, the conversational remote control protocols are used on the server-side for communication between the voice browser 236 and the conversational engines 241.

These different scenarios are implemented on top of an underlying network transport layer 252 (e.g. TCP/IP or WAP). The Multi-modal shell 242 can support tight MVC synchronization. When the Multi-modal shell 242 does not maintain a state of the application and fundamentally behaves like a virtual proxy this browser implements the lose synchronization as described above. The multi-modal browser of FIG. 26 can support content in content server 243 that is based on single or multiple authoring.

An edge server 253 is located server-side 234 and comprises the server-side edge of the network that provides all the necessary interfaces to identify the client device 230, communicate with the client over the network and interface with the backend intranet (TCP/IP; HTTP) to convert client and server request across the different network protocols. The gateway 254 performs the UI server function (but we emphasize the fact that it integrates with existing gateways). The edge server 253 further supports voice transport, synchronization and remote control protocols 255 between client and server components. Again, it is to be understood that the communication protocols are preferably integrated within existing gateways, designated by the edge server 253.

The conversational engines 241 comprise backend speech recognition and TTS as well as any other speech engine functionality required by the speech channel. The engines are designed to support the selected voice coding and transport protocols. This may be DSR, but as explained above, it is not limited to DSR solutions. The engines can be distributed with respect to the voice browser 236., which requires remote control of the engines from the Voice browser 236 via conversational remote control protocols (control and event notification).

It is to be understood that the integrated architecture shown in FIG. 26 can support multiple configurations. For instance, a fat client architecture shown in FIG. 27 comprises a client side GUI browser, voice Browser, conversational engines (typically limited) and the synchronization protocols support the distributed conversations control protocols for remotely controlling the server-side distributed conversational engines. This comprises a hybrid client-server solution. This architecture can exist with other variations where for example a VoiceXML browser can be on the client and as well as on the server and one will be used versus an other depending on the application or task at hand.

In general, switches between these different configurations (including all the topologies discussed herein is preferably supported by simply activating or deactivating modules using suitable negotiation protocols or interfaces. Similarly, different authoring mechanisms are preferably supported by activation of different modules in the multi-modal shell. Further, a distributed design creates a flexible architecture wherein the multi-modal browser components may be arranged in various configurations to provide a modular multi-modal browser designs having varying levels of functionality. For example, by using a distributed architecture, it is possible to keep the wireless client system thin, by placing the virtual proxy and the voice browser in a network server. This also helps to avoid extra content retrieval round trips across the wireless channel, which might be required in a client centric design e.g. to retrieve content referred to by an URL.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A multi-modal browser, comprising:
a plurality of modality-specific browsers, and
a multi-modal shell that parses and processes a modality-independent representation of an application to generate modality-specific representations of the application which are rendered by corresponding modality-specific browsers to generate modality-specific views of the application, and to manage synchronization of I/O (input/output) events across each modality-specific view,
wherein each modality-specific browser comprises:
an API (application programming interface) that enables the multi-model shell to control the browser and access events; and
a wrapper interface that support synchronization between the modality-specific views by event filtering and exhchanging synchronization information between the multi-modal shell and the browser,
wherein the multi-modal shell comprises:
a model manager for maintaining a dialog state of the application;
a TAV (transformation/adaption/view preparation) manager for preparing and transforming pages or page snippets; and
a synchronization manager for managing event notifications to the browsers.

2. The multi-modal browser of claim 1, wherein the API for a modality-specific browser comprises a DOM (document object model) interface.

3. The multi-modal browser of claim 2, wherein the wrapper interface comprises methods for DOM event filtering.

4. The multi-modal browser of claim 1, wherein the multi-modal shell maintains and updates a dialog state of the application.

5. The multi-modal browser of claim 1, wherein the multi-modal browser comprises a fat client framework.

6. The multi-modal browser of claim 1, wherein the multi-modal browser comprises a distributed framework.

7. The multi-modal shell of claim 1, wherein the multi-modal shell comprises a distributed framework.

8. The multi-modal browser of claim 1, wherein the plurality of modality-specific browsers comprise a WML (wireless markup language) browser and a VoiceXML browser.

9. The multi-modal browser of claim 8, further comprising an audio system for capturing and encoding speech data, and a plurality of speech engines for processing speech data.

10. A distributed WAP (wireless application protocol) multi-modal browser system, comprising:
a GUI (graphical user interface) browser that resides on a client device, wherein the GUI browser comprises a DOM (document object model) interface for controlling the GUI browser and managing DOM event notifications, and a wrapper interface for filtering events;

a speech application server comprising:
- a voice browser, wherein the voice browser comprises a DOM interface for controlling the voice browser and managing DOM event notifications, and a wrapper interface for filtering events; and
- an audio system for capturing and encoding speech data; and one or more speech engines for processing speech data,
- wherein the speech application server is distributed over a network;

a multi-modal shell system for parsing and processing a modality-independent application and managing synchronization of I/O (input/output) events between the GUI and voice browsers; and a communication manager that employs protocols for transporting encoded voice data to the speech engines and protocols for enabling synchronization of the GUI browser.

11. The WAP multi-modal browser of claim 10, wherein the GUI browser comprises a WML (wireless markup language) browser and wherein the voice browser comprises a VoiceXML browser.

12. The WAP multi-modal browser of claim 10, wherein the speech application server supports protocols for enabling remote control of the engines for server side speech processing.

13. The WAP multi-modal browser of claim 10, wherein the multi-modal shell system is distributed over the network.

14. A multi-modal browser, comprising:
- a plurality of modality-dependent browsers, and
- a multi-modal shell for parsing and processing a modality-independent application and managing synchronization of I/O (input/output) events across each view generated by the plurality of modality-dependent browsers, wherein each modality-dependent browser comprises:

an API (application programming interface) for controlling the browser and for managing events; and an external wrapper interface comprising synchronization protocols for supporting synchronization of the browser, and wherein the multi-modal shell comprises:

a model manager for maintaining a dialog state of the application;

a TAV (transformation/adaption/view preparation) manager for preparing and transforming pages or page snippets; and a synchronization manager for managing event notifications to the browsers.

* * * * *